US012805511B2

(12) United States Patent
DeNicola

(10) Patent No.: US 12,805,511 B2
(45) Date of Patent: Nov. 24, 2026

(54) ANIMAL TRAP

(71) Applicant: Field Engine Wildlife Research and Management LLC, Moodus, CT (US)

(72) Inventor: Anthony J. DeNicola, Moodus, CT (US)

(73) Assignee: FEIP LLC, Moodus, CT (US)

( * ) Notice: Subject to any disclaimer, the term of this patent is extended or adjusted under 35 U.S.C. 154(b) by 55 days.

(21) Appl. No.: 18/143,710

(22) Filed: May 5, 2023

(65) Prior Publication Data

US 2023/0301292 A1 Sep. 28, 2023

Related U.S. Application Data

(63) Continuation-in-part of application No. 17/535,161, filed on Nov. 24, 2021, now Pat. No. 11,974,563, (Continued)

(51) Int. Cl.
*A01M 23/08* (2006.01)
*A01M 23/02* (2006.01)
*A01M 23/14* (2006.01)

(52) U.S. Cl.
CPC ............ *A01M 23/08* (2013.01); *A01M 23/02* (2013.01); *A01M 23/14* (2013.01)

(58) Field of Classification Search
CPC ...... A01M 23/00; A01M 23/02; A01M 23/08; A01M 23/14; A01K 69/00; A01K 69/02;
(Continued)

(56) References Cited

U.S. PATENT DOCUMENTS 496,164 A * 4/1893 Manning ............... A01M 21/00 43/65
597,214 A * 1/1898 Douglas ................. A01K 31/08 256/45
(Continued)

FOREIGN PATENT DOCUMENTS

FR 2501003 A1 * 9/1982
FR 2501003 B1 1/1986
(Continued)

OTHER PUBLICATIONS

Translation of JPS596715Y2 (Year: 1984).*
EP Search Report for EP Patent Application No. 24174222.0 Feb. 24, 2025.

*Primary Examiner* — Darren W Ark
(74) *Attorney, Agent, or Firm* — Getz Balich LLC

(57) ABSTRACT

A flexible net structure and trap is provided that includes a net, an upper cord, and a secondary net. The net includes first flexible lines. The upper cord is attached to the net at an upper lateral edge and extends a first length of the net. The flexible net structure includes a wall portion that extends from the upper cord to a ground portion and the ground portion extends from a lower lateral edge to the wall portion. The collapsible net is configurable in a closed configuration where the first and second lengthwise ends are disposed proximate to each other. The secondary net is formed from second flexible lines. The secondary net is attached to the flexible net structure in the wall portion and is disposed on an interior side of the flexible net structure. The second flexible lines have a greater cut resistance than the first flexible lines.

52 Claims, 16 Drawing Sheets

Related U.S. Application Data which is a continuation of application No. 17/084,944, filed on Oct. 30, 2020, now Pat. No. 11,185,065.

(60) Provisional application No. 63/011,546, filed on Apr. 17, 2020, provisional application No. 62/935,272, filed on Nov. 14, 2019.

(58) Field of Classification Search

CPC ........ A01K 69/04; A01K 69/06; A01K 69/10; A01K 74/00; A01K 79/00; A01K 99/00; A01K 61/60; A01K 61/65; A01K 61/75; A01K 61/78; A01K 1/0035; A01K 1/0254; A01K 31/07; A01K 31/08; A01K 15/02; A01K 15/027; A01K 15/04; E04H 4/06

USPC .......... 43/58, 64–67, 73; 119/223; 256/12.5, 256/13, 19, 10; 405/302.4, 302.6, 302.7

See application file for complete search history.

(56) References Cited

U.S. PATENT DOCUMENTS

| | | | | | |
|---|---|---|---|---|---|
| 619,566 | A * | 2/1899 | Hall | A01M 21/00 | 43/65 |
| 2,549,475 | A * | 4/1951 | Jardim | A01K 73/12 | 43/7 |
| 2,680,922 | A * | 6/1954 | Welfl | A01M 23/00 | 43/60 |
| 2,814,326 | A * | 11/1957 | Washabaugh | B21F 27/127 | 72/392 |
| 3,061,966 | A * | 11/1962 | Conradin | A01K 79/00 | 43/4.5 |
| 3,172,229 | A * | 3/1965 | Swanson | A01M 23/00 | 43/65 |
| 3,484,981 | A * | 12/1969 | Gilmer | A01K 73/12 | 43/105 |
| 3,593,688 | A * | 7/1971 | Whitener | A01K 31/08 | 119/453 |
| 3,678,971 | A * | 7/1972 | Nordgren | B21F 27/127 | 219/56 |
| 3,715,831 | A * | 2/1973 | Mason | A01K 74/00 | 43/4.5 |
| 3,815,279 | A * | 6/1974 | Poirot | A01K 69/00 | 43/17 |
| 3,905,143 | A * | 9/1975 | Poirot | A01K 69/00 | 43/14 |
| 4,092,797 | A * | 6/1978 | Azurin | A01K 71/00 | 43/105 |
| 4,174,582 | A * | 11/1979 | McKnight | A01K 73/12 | 43/106 |
| 4,366,949 | A * | 1/1983 | Staub, Sr. | A01G 20/40 | 256/48 |
| 4,411,092 | A * | 10/1983 | Lalancette | A01K 69/08 | 43/100 |
| 4,452,005 | A * | 6/1984 | Poirot | A01K 69/06 | 43/4.5 |
| 4,860,996 | A * | 8/1989 | Robbins, III | A01K 3/005 | 256/48 |
| 4,973,029 | A * | 11/1990 | Robbins, III | A01K 3/005 | 264/171.18 |
| 5,063,876 | A * | 11/1991 | Harris | A01K 3/001 | 256/25 |
| 5,131,218 | A * | 7/1992 | Berger | D07B 1/20 | 57/237 |
| 5,193,481 | A * | 3/1993 | Loverich | A01K 73/12 | 119/223 |
| 5,218,925 | A * | 6/1993 | Anderson | A01K 1/0088 | 119/501 |
| 5,231,820 | A * | 8/1993 | Berger | D07B 1/20 | 57/1 R |
| RE34,971 | E * | 6/1995 | Loverich | A01K 73/12 | 119/223 |
| 5,509,227 | A * | 4/1996 | Marrero | A01K 73/12 | 43/100 |
| 5,553,833 | A * | 9/1996 | Bohen | E01F 13/026 | 256/19 |
| 5,617,813 | A * | 4/1997 | Loverich | A01K 61/60 | 119/223 |
| 5,758,602 | A * | 6/1998 | Fuglsang | A01K 61/54 | 119/237 |
| 5,961,099 | A * | 10/1999 | Thommen, Jr. | E01F 7/04 | 256/45 |
| 5,966,862 | A * | 10/1999 | Ueno | A01M 23/32 | 43/60 |
| 6,142,704 | A * | 11/2000 | Coyne | E02B 3/04 | 256/45 |
| 6,786,000 | B1 * | 9/2004 | Hong | A01K 73/12 | 43/105 |
| 6,843,616 | B2 * | 1/2005 | Sychra | E01F 7/02 | 210/170.03 |
| 7,140,599 | B1 * | 11/2006 | Spink | E02B 15/085 | 405/71 |
| 7,293,530 | B2 * | 11/2007 | Italiano | A01K 1/034 | 256/25 |
| 7,398,617 | B2 * | 7/2008 | Mattox | F41H 13/0006 | 43/58 |
| 7,487,614 | B1 * | 2/2009 | Walker | A01K 75/00 | 43/10 |
| 7,523,719 | B2 * | 4/2009 | Miller | A01K 31/08 | 119/496 |
| 7,562,453 | B1 * | 7/2009 | Benner | E04H 17/004 | 256/11 |
| 7,744,313 | B2 * | 6/2010 | Terai | E01F 13/12 | 405/211 |
| 7,854,088 | B2 * | 12/2010 | Kurachi | A01M 23/08 | 43/60 |
| 8,042,491 | B2 * | 10/2011 | Fulbrook | A01K 61/70 | 119/223 |
| 8,061,076 | B2 * | 11/2011 | Kelley | A01M 23/20 | 43/67 |
| 8,261,697 | B2 * | 9/2012 | Hsu | A01K 61/60 | 119/223 |
| 8,336,250 | B2 * | 12/2012 | Kelley | A01M 23/20 | 43/67 |
| 8,661,727 | B2 * | 3/2014 | Alfarhan | A01M 23/20 | 43/62 |
| 9,101,126 | B2 * | 8/2015 | Pinkston | A01M 31/002 | |
| 9,237,743 | B2 * | 1/2016 | Gaskamp | A01M 23/20 | |
| 9,271,477 | B2 * | 3/2016 | Angell | A01K 61/10 | |
| 9,545,094 | B2 * | 1/2017 | Dykes | A01M 23/20 | |
| 9,572,328 | B1 * | 2/2017 | Head | A01K 75/02 | |
| 9,668,467 | B2 * | 6/2017 | Gaskamp | A01M 23/00 | |
| 9,781,906 | B2 * | 10/2017 | Wang | A01K 61/60 | |
| 9,814,228 | B2 * | 11/2017 | Pinkston | G03B 29/00 | |
| 9,826,710 | B1 * | 11/2017 | McNew | A01K 1/0017 | |
| 10,076,109 | B2 * | 9/2018 | Gaskamp | A01M 23/16 | |
| 10,098,339 | B2 * | 10/2018 | Pinkston | G03B 29/00 | |
| 10,375,940 | B2 * | 8/2019 | Al-Farhan | A01K 97/12 | |
| 10,470,454 | B2 * | 11/2019 | Gaskamp | A01M 23/22 | |
| 10,534,967 | B2 * | 1/2020 | Atwater | A01K 61/13 | |
| 10,645,901 | B2 * | 5/2020 | McNew | A01K 1/0023 | |
| 10,694,735 | B2 * | 6/2020 | Romano | A01M 29/30 | |
| 10,721,925 | B2 * | 7/2020 | Romano | A01M 23/34 | |
| 10,905,090 | B2 * | 2/2021 | Morris | A01K 1/0017 | |
| 10,959,416 | B2 * | 3/2021 | Bajer | A01K 74/00 | |
| 10,973,222 | B1 * | 4/2021 | Pankey | A01M 23/22 | |
| 11,185,065 | B2 * | 11/2021 | DeNicola | A01M 23/14 | |
| 11,503,814 | B2 * | 11/2022 | Bajer | A01K 69/04 | |
| 12,016,324 | B2 * | 6/2024 | Creel | A01M 23/08 | |
| 2004/0173786 | A1 * | 9/2004 | Robbins | A01K 3/005 | 256/10 |
| 2005/0183331 | A1 * | 8/2005 | Kania | A01K 61/70 | 47/65.5 |
| 2009/0293340 | A1 | 12/2009 | Kelley | | |
| 2010/0064572 | A1 * | 3/2010 | Kurachi | A01M 23/08 | 43/61 |
| 2010/0154287 | A1 * | 6/2010 | Irons | A01M 23/22 | 43/62 |

(56) References Cited

U.S. PATENT DOCUMENTS

| | | | | |
|---|---|---|---|---|
| 2011/0047858 | A1* | 3/2011 | Wu | A01M 23/04 43/69 |
| 2011/0073046 | A1* | 3/2011 | Fischer | A01K 15/022 119/718 |
| 2011/0167709 | A1 | 7/2011 | Pinkston | |
| 2013/0205645 | A1* | 8/2013 | Gaskamp | A01M 23/22 43/62 |
| 2016/0015021 | A1* | 1/2016 | Green | A01M 23/00 43/131 |
| 2016/0050903 | A1 | 2/2016 | Gaskamp | |
| 2016/0066536 | A1* | 3/2016 | Fitzgerald | A01K 3/005 256/10 |
| 2017/0354138 | A1* | 12/2017 | Romano | A01M 23/00 |
| 2018/0070556 | A1* | 3/2018 | Hagen | A01M 29/28 |
| 2018/0077919 | A1 | 3/2018 | Mcnew | |
| 2019/0208764 | A1* | 7/2019 | Romano | A01M 23/34 |
| 2019/0364874 | A1* | 12/2019 | Hufstedler | E05D 15/165 |
| 2020/0068860 | A1* | 3/2020 | Bajer | A01K 71/00 |
| 2020/0104602 | A1* | 4/2020 | Atwater | A01K 61/13 |
| 2020/0187463 | A1* | 6/2020 | Grytdal | A01K 61/60 |
| 2020/0187464 | A1* | 6/2020 | MacGillivray | A01K 63/10 |
| 2020/0260683 | A1* | 8/2020 | McNew | A01K 1/0023 |
| 2021/0007333 | A1* | 1/2021 | Cui | B63B 35/26 |
| 2021/0144979 | A1* | 5/2021 | Bajer | A01K 75/00 |
| 2021/0144988 | A1 | 5/2021 | Denicola | |
| 2021/0368774 | A1* | 12/2021 | Jordan | A01M 31/002 |
| 2022/0151218 | A1* | 5/2022 | Davis | A01M 23/08 |
| 2023/0263151 | A1* | 8/2023 | Creel | A01M 23/08 43/61 |
| 2025/0275527 | A1* | 9/2025 | Kennamer | A01M 23/20 |

FOREIGN PATENT DOCUMENTS

| | | | | | |
|---|---|---|---|---|---|
| FR | 2955456 | B1 | * | 7/2012 | A01M 23/08 |
| GB | 692318 | A | * | 6/1953 | |
| GB | 729110 | A | * | 5/1955 | |
| JP | S56141088 | | | 10/1981 | |
| JP | S596715 | Y2 | * | 3/1984 | |
| JP | 03297338 | A | * | 12/1991 | |
| JP | H0641486 | | | 6/1994 | |
| JP | H0641486 | U | * | 6/1994 | |
| JP | 7011589 | | | 3/1995 | |
| JP | 7011589 | Y2 | * | 3/1995 | |
| JP | 2006000020 | A | * | 1/2006 | |
| JP | 2010207212 | A | * | 9/2010 | |
| JP | 2011125336 | A | * | 6/2011 | A01K 61/007 |
| JP | 2011167083 | A | * | 9/2011 | |
| JP | 2011250718 | A | * | 12/2011 | |
| JP | 5315471 | | | 10/2013 | |
| JP | 5315471 | B1 | * | 10/2013 | |
| JP | 2013243963 | A | * | 12/2013 | |
| JP | 2014014310 | A | * | 1/2014 | |
| JP | 2014083049 | A | * | 5/2014 | |
| JP | 6171144 | | | 8/2017 | |
| JP | 6171144 | B2 | * | 8/2017 | |
| JP | 2017176082 | A | * | 10/2017 | |
| JP | 2018029626 | A | * | 3/2018 | |
| JP | 2018099044 | A | * | 6/2018 | |
| JP | 6421390 | | | 11/2018 | |
| JP | 6421390 | B2 | * | 11/2018 | |
| JP | 6454847 | | | 1/2019 | |
| JP | 6454847 | B2 | * | 1/2019 | |
| JP | 6534130 | B2 | * | 6/2019 | |
| JP | 2020166337 | A | * | 10/2020 | |
| JP | 2020171248 | A | * | 10/2020 | |
| KR | 20030045753 | A | * | 6/2003 | |
| KR | 20040094269 | A | * | 11/2004 | |
| KR | 20060088092 | A | * | 8/2006 | |
| KR | 20090076491 | A | * | 7/2009 | |
| KR | 20100070531 | A | * | 6/2010 | |
| KR | 20110101567 | A | * | 9/2011 | |
| KR | 20200022101 | A | * | 3/2020 | |
| WO | 9304576 | W | | 3/1993 | |
| WO | WO-9304576 | A1 | * | 3/1993 | A01K 61/60 |
| WO | WO-2017083361 | A1 | * | 5/2017 | A01K 74/00 |
| WO | WO-2019045582 | A1 | * | 3/2019 | A01K 61/60 |
| WO | WO-2020122731 | A1 | * | 6/2020 | A01K 69/06 |

* cited by examiner

ANIMAL TRAP

CROSS-REFERENCE TO RELATED APPLICATIONS

This application is a continuation-in-part of and claims priority to U.S. patent application Ser. No. 17/535,161 filed on Nov. 24, 2021, which is a continuation of U.S. patent application Ser. No. 17/084,944 filed Oct. 30, 2020, issued as U.S. Pat. No. 11,185,065, which claims priority to U.S. Provisional Patent Application No. 62/935,272 filed on Nov. 14, 2019, and U.S. Provisional Patent Application No. 63/011,546 filed on Apr. 17, 2020, all of which are hereby incorporated by reference in their entirety.

BACKGROUND OF THE INVENTION

1. Technical Field

The present disclosure relates to animal traps in general, and to net animal traps in particular.

2. Background Information

Feral swine are a destructive invasive species in many areas of the world. In the United States alone, it is estimated that two to six million feral hogs are currently present in at least thirty-nine states, and do millions of dollars in damage every year. Feral swine are prodigious breeders and in many areas have few or no natural predators.

Feral swine damage crops by consuming them or by their rooting, trampling, and wallowing behaviors. Field crops commonly targeted by feral swine include sugar cane, corn, grain sorghum, soybeans, wheat, oats, peanuts, and rice; however, they will eat almost any crop. Farmers may also experience damage to vegetable and fruit crops such as lettuce, spinach, melons, and pumpkins. Feral swine damage pasture grasses, killing desirable plant species. The decimation of these desirable plant species can, in turn, facilitate the proliferation of undesired weed species. Feral swine can also devastate orchards and vineyards by consuming fruit, berries, citrus, grapes, and nuts, destroy saplings and vines by roughly rubbing on the plants with their bodies (which they do to remove parasites from their skin), and damage large trees by scraping bark off with their tusks to mark territory, creating an entry point for diseases on the tree.

Feral swine compete with native wildlife for multiple resources, specifically food, habitat, and water. Feral swine diets overlap with those of native wildlife, such as bear, deer, and turkey, which results in competition for important and limited natural food supplies. Feral swine activity will often deter other species from living in an area, resulting in competition over prime habitat. Feral swine also prey directly on the nests, eggs, and young of native ground nesting birds and reptiles, including threatened or endangered species. Game birds such as wild turkeys, grouse, and quail are often negatively affected. Feral swine wallows are prime mosquito habitat which contributes to the prevalence of various mosquito-borne diseases. Wallows can also be a place of transmission for bacteria and parasites from feral swine to native wildlife that come to drink.

Feral swine are known to carry at least thirty (30) viral and bacterial diseases and nearly forty (40) parasites that can be transmitted to humans, pets, livestock, and other wildlife. Feral swine can pass pathogens in many ways; e.g., by direct contact with feral swine or their scat, via feed and water sources previously contaminated by feral swine, or by eating raw, infected feral swine meat, organs, or other tissues.

Efforts to control feral swine populations to date have been largely ineffective. The ability of feral swine to reproduce outpaces conventional hunting techniques, and very often landowners or local regulations do not permit hunting. Various traps are known, but none of these traps are capable of readily being used in all settings and therefore are limited. For example, feral swine are often present in remote areas, not easily accessible by vehicle. Box traps are typically large, heavy structures not easily carried, if at all, to a remote location. Indeed, the size and weight of box traps often not only limits where they can be utilized, but also how many swine may be caught therein. In some instances, box traps may be disassembled for transport, but then must be reassembled in the field—but the overall weight of the trap does not change. Box traps also typically have an elaborate door mechanism that permits ingress, but no exit, or remotely controlled doors that require a user to monitor the trap (e.g., via camera).

Some corral traps formed from stiff wire fencing may overcome the shortcomings of box traps, but they too have their own shortfalls. Although lighter than box traps, and typically larger than box traps, corral traps can also be prohibitively heavy and difficult to transport. The time required to set up stiff wire corral traps is typically significant, often requires some amount of environment clearance to enable the stiff wire fencing to be installed, and may be limited to use on flat ground areas. Like box traps, corral traps also typically utilize elaborate door mechanisms.

Other efforts to control feral swine populations utilize ingestible poisons. The use of poisons is often frowned upon for fear that native wildlife or domestic animals will either directly ingest the poison or will ingest the poison from a feral pig who earlier ingested the poison.

What is needed is a trap system and methodology that overcomes the shortfalls of currently available traps, and in particular a trap system and methodology that can be used for animals other than feral swine.

SUMMARY

According to an aspect of the present disclosure, a flexible net structure is provided that includes a collapsible net, a flexible upper cord, and a secondary net. The collapsible net (CN) is formed from a plurality of spaced apart first flexible lines that define a plurality of openings within the net. The net has a width that extends between a CN upper lateral edge and a CN lower lateral edge, a first length that extends between a first lengthwise end and a second lengthwise end at the CN upper lateral edge, and a second length that extends between the first lengthwise end and the second lengthwise end at the CN lower lateral edge. The flexible upper cord is attached to the collapsible net at the CN upper lateral edge and extends the first length of the net. The flexible net structure includes a wall portion and a ground portion. The wall portion extends from flexible upper cord to the ground portion and the ground portion extends from the CN lower lateral edge to the wall portion. The collapsible net is configurable in a closed configuration where the first lengthwise end and the second lengthwise end are disposed proximate to each other, and the CN lower lateral edge defines a trap opening. The secondary net (SN) is formed from a plurality of spaced apart second flexible lines that define a plurality of openings within the secondary net. The secondary net is attached to the flexible net structure in the wall portion and is disposed on an interior side of the flexible net structure, extending between the CN first lengthwise end and the CN second lengthwise end and extending downwardly toward the CN lower lateral edge. The second flexible lines have a greater cut resistance than the first flexible lines.

In any of the aspects or embodiments described above and herein, the first flexible lines may have a diameter D1 and the second flexible lines may have a diameter D2, and diameter D2 is larger than diameter D1.

In any of the aspects or embodiments described above and herein, the first flexible lines and the second flexible lines may comprise the same material.

In any of the aspects or embodiments described above and herein, the diameter D2 of the second flexible lines may be in a range of about one and a half to two and a half times larger than the diameter D1 of the first flexible lines.

In any of the aspects or embodiments described above and herein, the first flexible lines may have a first tensile strength and the second flexible lines may have a second tensile strength, and the second tensile strength is greater than the first tensile strength.

In any of the aspects or embodiments described above and herein, the secondary net may include an SN upper lateral edge and an SN lower lateral edge that are substantially parallel with the CN upper lateral edge.

In any of the aspects or embodiments described above and herein, the second material may include metallic elements.

In any of the aspects or embodiments described above and herein, the first flexible lines may be uniformly configured between the CN upper lateral edge and the CN lower lateral edge, and uniformly configured between the first lengthwise end and the second lengthwise end.

According to an aspect of the present disclosure, a trap for trapping animals is provided that includes a flexible net structure and a plurality of posts. The flexible net structure includes a collapsible net, a flexible upper cord, and a secondary net. The collapsible net (CN) is formed from a plurality of spaced apart first flexible lines that define a plurality of openings within the net. The net has a width that extends between a CN upper lateral edge and a CN lower lateral edge, a first length that extends between a first lengthwise end and a second lengthwise end at the CN upper lateral edge, and a second length that extends between the first lengthwise end and the second lengthwise end at the CN lower lateral edge. The flexible upper cord is attached to the collapsible net at the CN upper lateral edge and extends the first length of the net. The secondary net (SN) is formed from a plurality of spaced apart second flexible lines that define a plurality of openings within the secondary net. The secondary net is attached to the flexible net structure and is disposed on an interior side of the flexible net structure, extending between the CN first lengthwise end and the CN second lengthwise end. The second flexible lines have a greater cut resistance than the first flexible lines. The plurality of posts are configured to support the flexible net structure above a ground surface. The flexible net structure is disposable in a set configuration wherein the collapsible net is disposed in a closed circumferential structure that defines a trap interior region and a trap opening. In the set configuration, a ground portion of the collapsible net, including the trap opening defined by the ground portion, is in contact with the ground surface and a wall portion of the collapsible net extends upwardly from the ground surface. The secondary net is disposed contiguous with the wall portion of the collapsible net.

In any of the aspects or embodiments described above and herein, the secondary net may include an SN upper lateral edge and an SN lower lateral edge that are substantially parallel the CN upper lateral edge, and both the SN upper lateral edge and the SN lower lateral edge may be disposed contiguous with the wall portion of the collapsible net.

In any of the aspects or embodiments described above and herein, the flexible net structure may have a first circumference at the upper lateral edge and portions of the collapsible net proximate the lower lateral edge may be cinched up so that a second circumference at the trap opening is smaller than the first circumference at the upper lateral edge.

In any of the aspects or embodiments described above and herein, the second circumference may be in the range of about 35% to 90% of the first circumference and the trap opening is centrally located within the trap.

In any of the aspects or embodiments described above and herein, the trap may include a transfer chute configured to be attached to the collapsible net (CN) and configured to extend outwardly from the trap. The transfer chute has a net end and a terminal end. The transfer chute may include a net end cover attached to the collapsible net. The net end cover may be formed from a plurality of spaced apart third second flexible lines that define a plurality of openings within the sent end cover. The net end cover is configured to be disposed in a closed configuration wherein the net end cover covers the net end of the transfer chute and in an open configuration wherein the net end cover exposes the net end of the transfer chute.

In any of the aspects or embodiments described above and herein, the transfer chute may be configured to form an interior passage that extends between the net end and the terminal end. The transfer chute may include a gate panel disposed within the interior passage. The gate panel may be configured to permit passage through the interior passage in a first direction from the net end to the terminal end, and to impede passage through the interior passage in a second direction, opposite the first direction, from the terminal end to the net end.

According to an aspect of the present disclosure, a trap for trapping animals is provided. The trap includes a flexible net structure, a plurality of posts, and a plurality of tensioning structures. The flexible net structure includes a collapsible net and a flexible upper cord. The collapsible net is formed from a plurality of spaced apart first flexible lines that define a plurality of openings within the net. The net has a width that extends between a CN upper lateral edge and a CN lower lateral edge and a length that extends between a first lengthwise end and a second lengthwise. The flexible upper cord is attached to the collapsible net at the CN upper lateral edge extending the length of the net. The plurality of posts are configured to support the flexible net structure above a ground surface. Each post extends lengthwise between a ground end and an upper end. The flexible net structure is disposable in a set configuration wherein the collapsible net is disposed in a closed circumferential structure that defines a trap interior region and a trap opening. In the set configuration, a ground portion of the collapsible net, including the trap opening defined by the ground portion, is in contact with the ground surface and a wall portion of the collapsible net extends upwardly from the ground surface. Each tensioning structure is configured to pull a respective post in a first radially outward direction and in a second direction toward the ground surface. A ground flange is attached to each post proximate the ground end of the respective post and extends laterally out from the post. In the set configuration, a respective tensioning structure biases the ground flange in contact with the ground surface, and the ground flange is configured to impede the respective post from being forced into the ground surface beyond the ground flange.

In any of the aspects or embodiments described above and herein, the ground flange may extend laterally outward from the post in a direction that is substantially perpendicular to a length of the post.

In any of the aspects or embodiments described above and herein, a clamp may be attached to each post configured to be in contact with the respective ground flange. The clamp may be configured to prevent the respective ground flange from traveling past a point on the respective post.

In any of the aspects or embodiments described above and herein, each respective ground flange may extend laterally outward from a respective post around a periphery of the respective post in directions that are substantially perpendicular to a length of the respective post.

The foregoing features and the operation of the present disclosure will become more apparent in light of the following description and the accompanying drawings.

DETAILED DESCRIPTION

Figure 1:
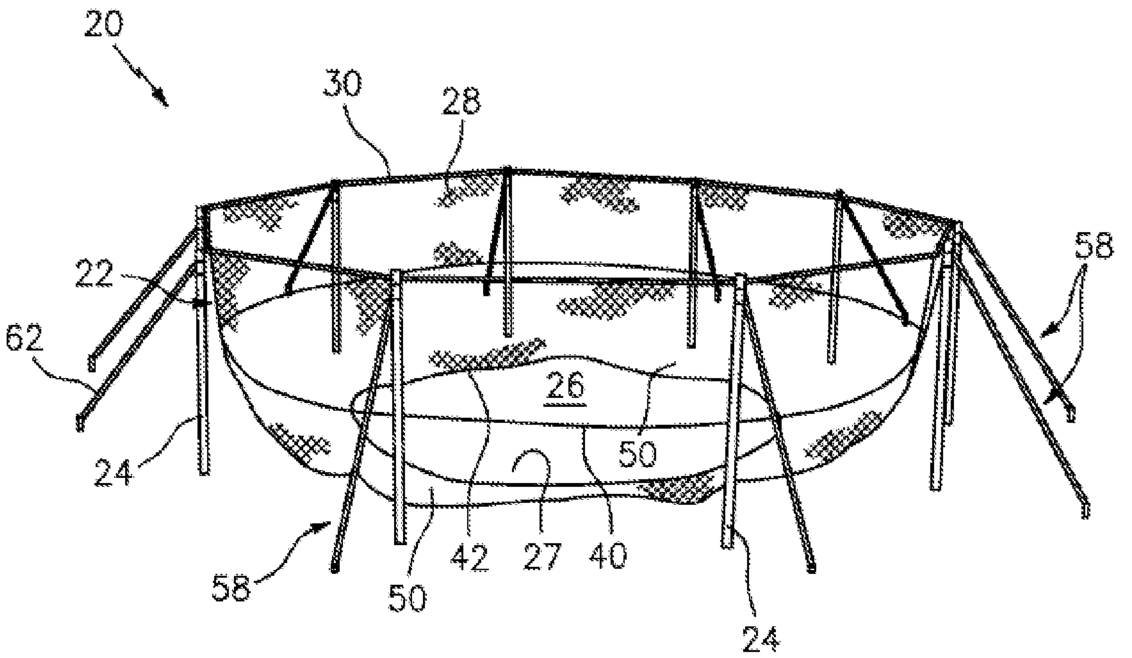
FIG. 1 is a diagrammatic perspective view of a present disclosure animal trap embodiment.
Figure 2:
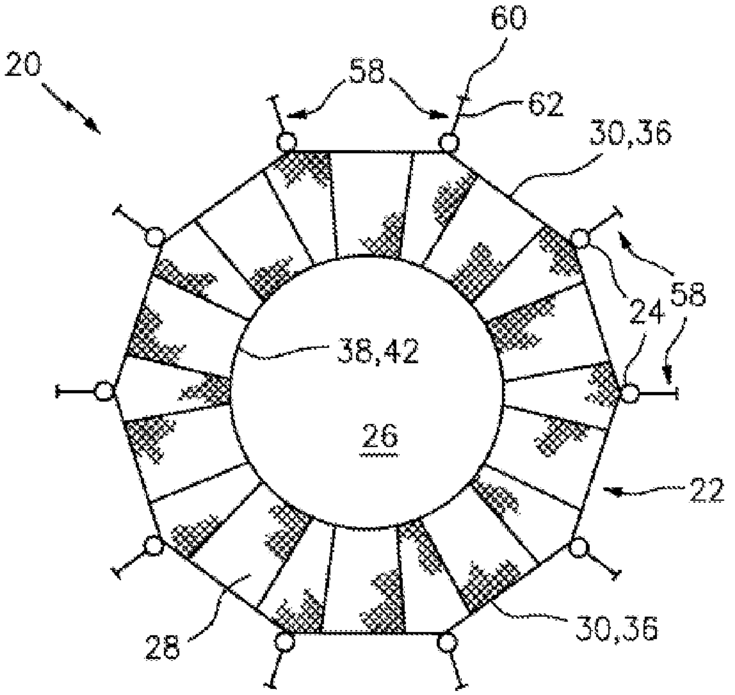
FIG. 2 is a diagrammatic top view of a present disclosure animal trap embodiment.

FIGS. 1 and 2 illustrate an exemplary embodiment of an animal trap 20 according to the present disclosure. The animal trap 20 embodiment includes a net structure 22. Some embodiments of the animal trap include a plurality of posts 24 as part of the trap 20. When the animal trap 20 is set up to trap animals (i.e., in a "set configuration"), the net structure 22 is configured as a closed circumferential structure that defines a trap interior region 26 and a trap opening 27; i.e., the net structure 22 is continuous around the circumference of the trap 20. More specifically, in the set configuration, a portion of the net structure 22 is in contact with the ground (described as a "ground portion 50" hereinafter), and the remainder of the net structure 22 extends upwardly from the ground, forming a closed wall structure. The term "closed structure" is used herein to mean that the net structure 22 extends continuously around the entire perimeter of the trap 20, with no door, gate, or opening within the closed wall structure that permits animal ingress or egress through the closed wall structure. As will be described herein, the lower lateral edge 38 of the ground portion 50 of the net structure 22 defines the trap opening 27. Also as will be described herein, embodiments of the present animal trap 20 may be configured with a substantially circular structure, with the net structure 22 in the set configuration having a first circumference at an upper lateral edge and a second circumference at a lower lateral edge disposed on the ground. The second circumference is smaller than the first circumference. In some embodiments, the vertical top of the animal trap 20 is open.

The net structure 22 includes a net 28 and an upper cord 30. The net structure 22 has a length extending between a first lengthwise end 32 and a second lengthwise end 34, and a width extending between an upper lateral edge 36 and a lower lateral edge 38. In some embodiments, the length may be between thirty (30) and one hundred and twenty (120) feet long (e.g., between sixty (60) and eighty (80) feet) and the width may be in the range of six (6) to ten (10) feet wide. The upper cord 30 is disposed along the upper lateral edge 36 and extends lengthwise between the first and second lengthwise ends 32, 34. The size and material of the upper cord 30 can vary depending on the application. For many applications, the upper cord 30 may comprise a polymeric material such as polypropylene, nylon, polyester, polyethylene, aramid, or the like, and any combination thereof. Alternatively, the upper cord 30 may comprise natural fibers such as hemp. Generally speaking, an upper cord 30 comprising polymeric material is preferred because of its superior strength, resistance to degradation, and light weight. A specific non-limiting example of an upper cord 30 is a high-density polypropylene cord having a diameter in the range of about 0.25 inches to about 1.0 inches (0.25-1.0 inches; 6.35 mm-25.4 mm). The present disclosure is not, however, limited to any particular upper cord material or construction.

Figure 3:
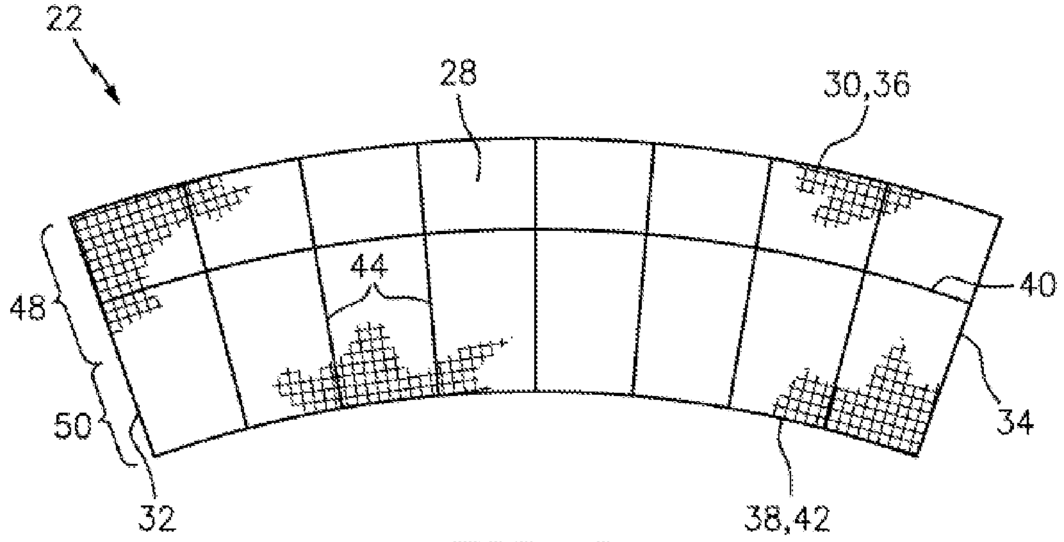
FIG. 3 is a diagrammatic view of a present disclosure net structure embodiment.
Figure 3A:
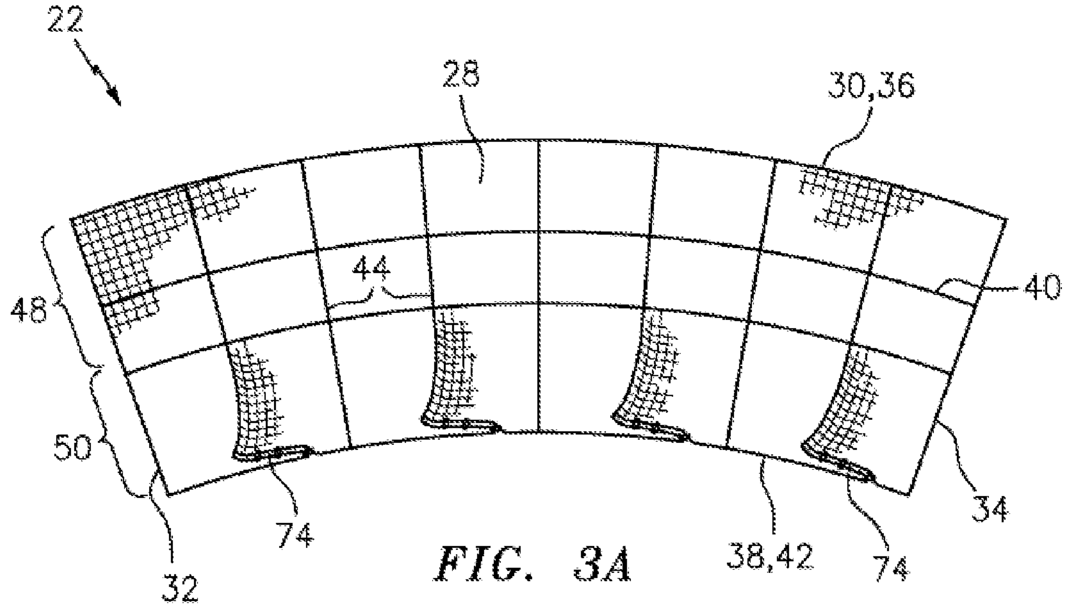
FIG. 3A is a diagrammatic view of a present disclosure net structure embodiment.

Referring to FIGS. 1, 3 and 3A, in some embodiments the net structure 22 may include a mid-cord 40 disposed in a middle region of the net 28 (i.e., between the upper lateral edge 36 and the lower lateral edge 38, and therefore spaced apart from the upper cord 30), extending lengthwise between the first and second lengthwise ends 32, 34. The term “mid-cord” should not be interpreted as implying that the mid-cord 40 is located at the geometric middle point of the width of the net 28. Typically in those embodiments that include a mid-cord 40, the upper cord 30 and the mid-cord 40 extend lengthwise generally parallel to one another. The size and material of the mid-cord 40 may be as described above for the upper cord 30. The mid-cord is not required to be the exact same size and material as the upper cord 30, however.

In some embodiments, the net structure 22 may include a bottom cord 42 attached to the net 28 along the lower lateral edge 38. The size and material of the bottom cord 42 may be as described above for the upper cord 30. In preferred embodiments, the bottom cord 42 may have a weight per unit length that is greater than the weight per unit length of the upper cord 30. A non-limiting example of an acceptable bottom cord 42 is a weighted cord having a lead core.

In some embodiments, the net structure 22 may include a plurality of widthwise extending rib cords 44 (e.g., extending widthwise between the upper lateral edge 36 and the lower lateral edge 38) spaced apart from one another at lengthwise positions. A rib cord 44 may be disposed at each lengthwise end 32, 34 of the net structure 22. The size and material of a rib cord 44 may be as described above for the upper cord 30. The rib cords 44 are not required to be the exact same size and material as the upper cord 30, however.

Figure 4:
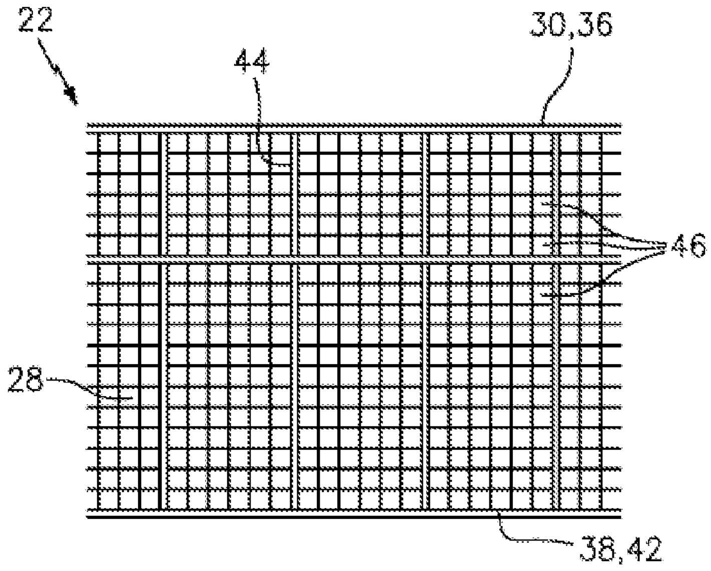
FIG. 4 is a diagrammatic partial view of a present disclosure net structure embodiment.

Referring to FIGS. 3, 3A, and 4, the net 28 is a mesh structure formed from a plurality of flexible lines that are connected to one another in a pattern that creates openings 46 between adjacent lines. The lines are attached to one another to one another to fix the size of the openings 46. The lines within the net 28 may be orthogonally arranged (e.g., vertically extending lines and horizontally extending lines), but the present disclosure is not limited to nets having orthogonal lines. The openings 46 within the net 28 are large enough so that the net 28 does not substantially obstruct vision through the net 28, but small enough to prevent the trapped animal from escaping through the openings 46. The net 28 is configured to withstand impacts by the animal being trapped (as will be described below), and is preferably also sufficiently durable to prevent a trapped animal from chewing or otherwise cutting through the net 28 during a period of time in which the animal is expected to be trapped. The net 28 may comprise polymeric materials such as polypropylene, nylon, polyester, polyethylene, aramid, and the like, or combinations thereof. Alternatively, the net 28 may comprise natural fibers such as hemp. Generally speaking, polymeric nets are preferred because of their superior strength, resistance to degradation, and light-weight. The present disclosure is not, however, limited to any particular net 28 material or construction. Non-limiting examples of acceptable nets 28 include some nets of the type constructed for use as baseball nets, or golf ball nets, or in some instances fishing nets. For a net structure 22 configured for trapping feral swine, a net 28 comprising a flexible line size in the range of #18-#96 twine (i.e., a twine diameter range of about 1.5 mm to about 4.0 mm, or about 0.06 inches to about 0.158 inches), and having openings 46 in the range of about 0.75 inches (19.0 mm) to about 2.0 inches (50.8 mm) is typically acceptable. The present disclosure is not limited to these exemplary flexible line diameter and opening range values. The specific characteristics of the net 28 may depend on the application at hand, and the net 28 materials being used; e.g., a net flexible line having a greater tensile strength may permit a smaller diameter flexible line, etc.

Figure 5:
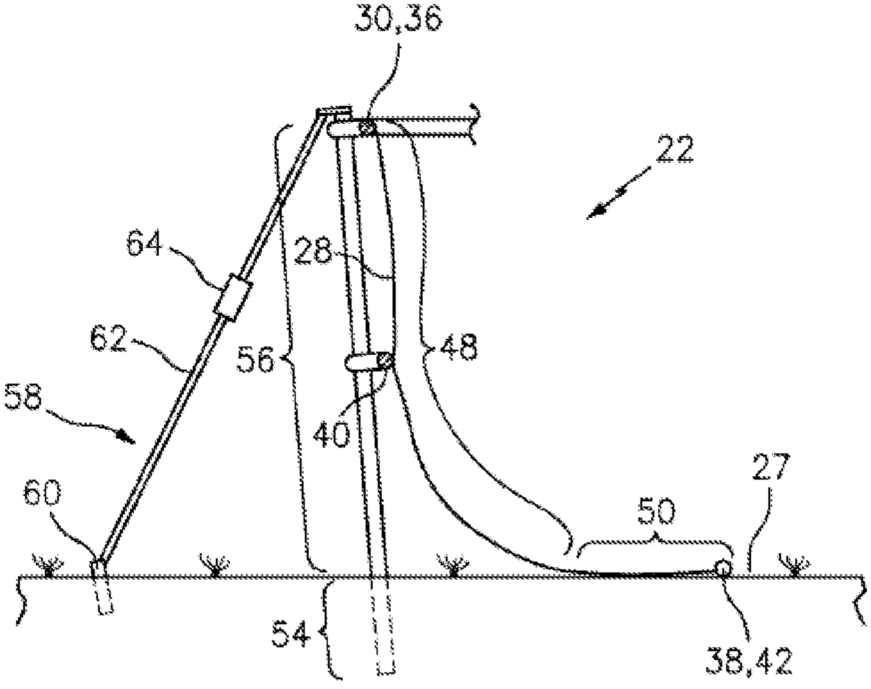
FIG. 5 is a diagrammatic side view of a portion of a present disclosure animal trap embodiment.
Figure 6:
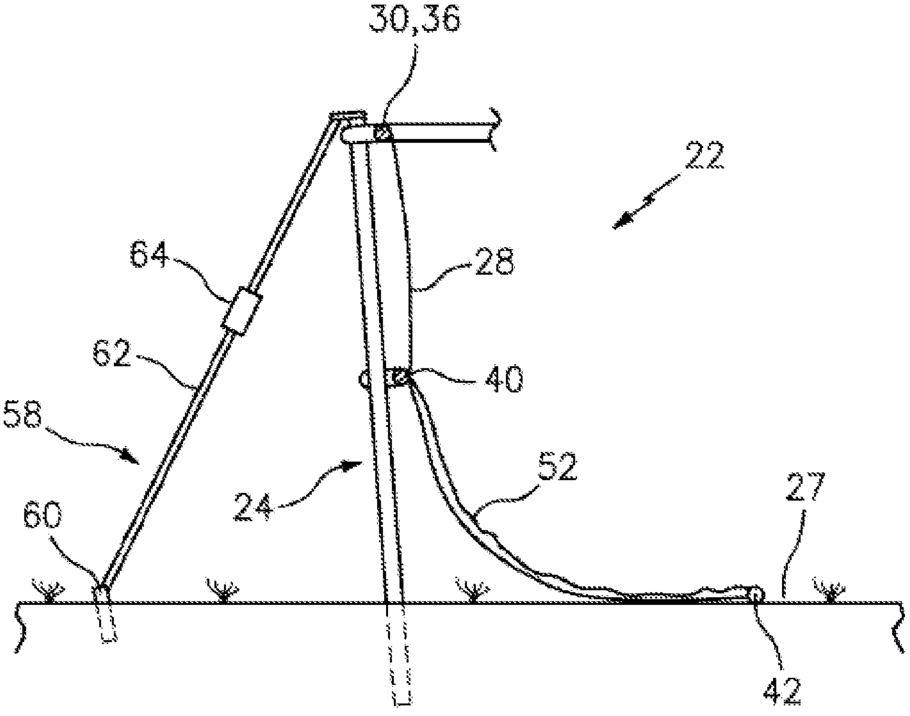
FIG. 6 is a diagrammatic side view of a portion of a present disclosure animal trap embodiment.
Figure 14:
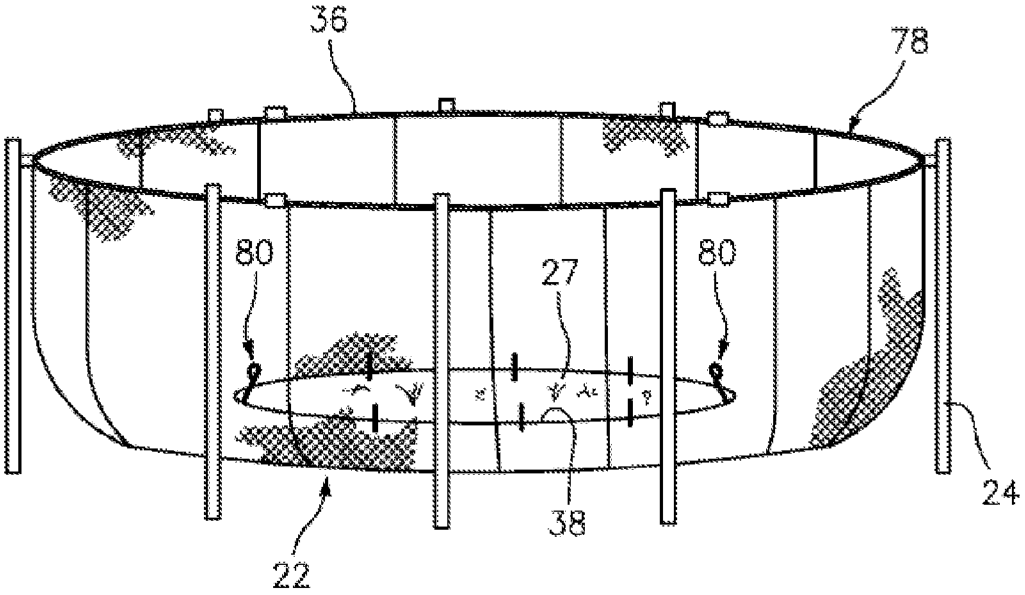
FIG. 14 diagrammatically illustrates an embodiment of the present disclosure trap having a structural ring.

Referring to FIGS. 5 and 6, the net structure 22 may be described as having a wall portion 48 and a ground portion 50. In the set configuration, the wall portion 48 is disposed above the ground and therefore not in contact with the ground. The ground portion 50, in contrast, is disposed in contact with the ground when the net structure 22 is in the set configuration. In the set configuration, the circumferentially extending lower lateral edge 38 defines the trap opening 27; i.e., defines a central ground area encircled by the net structure 22 where no net 28 resides on the ground. The width of the ground portion 50 of the net structure 22 is great enough such that when an animal in the interior region of the trap approaches the wall portion 48, that animal will step on the ground portion 50. The weight of the animal stepping on the ground portion 50 as it approaches the wall portion 48 helps to anchor the net structure 22 to the ground and prevent the animal from escaping from the trap 20. In terms of the entire width of the net structure 22, the ground portion 50 is typically about 25-40% of the width of the net structure 22. Embodiments of the present disclosure trap 20 that are configured to trap feral swine, for example, typically have a net structure ground portion 50 that is about twenty-four to about thirty-six inches (24-36"; 610-915 mm) wide when the trap 20 is in a set configuration, and an overall net structure 22 width of about ninety to ninety-six inches (90-96 inches; 2280 mm-2440 mm). As can be seen in the Figures, along any diagonal line bisecting the trap 20, the ground portion 50 (in the set configuration) will extend a distance radially inward on a first side of the trap 20, ending at the lower lateral edge 38. From there, along the same diagonal line, the trap opening 27 (no net 28) extends to the ground portion 50 extending radially inward from a second side of the trap 20, opposite the first side. The present disclosure is not limited to any particular wall portion 48 height, and therefore not limited to any overall net structure 22 width. As described herein, embodiments of the present disclosure may include a net 28 that has a first length that extends between lengthwise ends 32, 34 of the net 38 at the upper lateral edge 36, and a second length that extends between the lengthwise ends 32, 34 of the net at the lower lateral edge 38, wherein the second length is less than the first length. This difference in lengths between the upper and lower lateral edges 36, 38 is also disclosed herein in terms of circumference; i.e., a first circumference at the upper lateral edge 36 and a second circumference at the lower lateral edge 38, wherein the first circumference is greater than the second circumference. The length of the net 28 is disclosed herein as being within the range of thirty to one hundred and twenty feet long (30-120 ft), and in particular between sixty and eighty feet long (60-80 ft). As disclosed herein, the width of the net 28 may be in the range of six to ten feet wide (6-10 ft). As disclosed herein, the width of the net 28 may be described as having a wall portion 48 and a ground portion 50, and the ground portion 50 is typically about 25-40% of the width of the net 28. Within these parameters, the size of the trap opening 27 when the trap 20 is in a set/closed configuration will vary depending on the length of the net 28, the width of the net 28, and the percentage of the net 28 width that is occupied by the ground portion 50 and may be described in terms of a range. The aforesaid net 28 size range may extend between a net 28 at the upper end of the range with an upper lateral edge 36 length of 120 ft (which defines an upper lateral edge diameter of about 38 ft, a lower lateral edge 38 length of about 107 ft, and a lower lateral edge diameter (i.e., trap opening) of about 34 ft) to a net 28 at the lower end of the range with an upper lateral edge 36 length of about 30 ft (which defines a lower lateral edge 38 length of about 17 ft, and a lower lateral edge 38 diameter (i.e., trap opening 27 diameter) of about 3 ft). In the specifically disclosed net 28 embodiment having an upper lateral edge 36 length of 60 ft, the net 28 would have an upper lateral edge 36 diameter of about 19 ft, a lower lateral edge 38 length of about 47 ft, and a lower lateral edge 38 diameter (i.e., trap opening 27) of about 15 ft. In all net 28 embodiments, the trap opening 27 is sized to permit an animal (e.g., feral swine) to enter the trap 20 through the trap opening 27. The relative size of the trap upper lateral edge 36 diameter to the trap lower lateral edge 38 diameter (i.e., trap opening 27 diameter) is illustrated in FIGS. 1, 2, and 14. Within the given exemplary net parameters, the trap opening 27 diameter is typically in the range of about 35% to about 90% of the trap diameter at the upper lateral edge 36.

Figure 20:
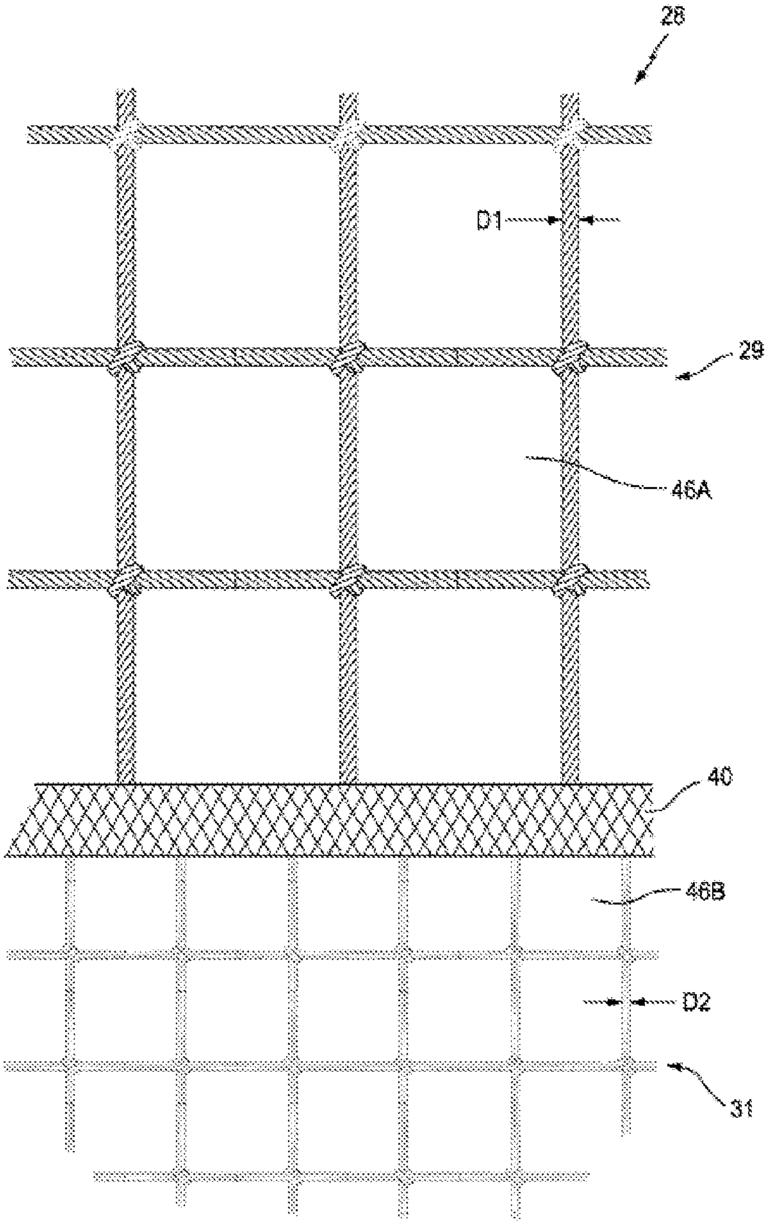
FIG. 20 illustrates a net configuration having a first net region having a first net configuration, and a second net region having a second net configuration, where the second net configuration is different from the first net configuration.

In some embodiments, the entirety of the net 28 has a uniform configuration; e.g., the same flexible line diameter, material, and opening size throughout the entire net 28 (as shown in FIG. 4). In alternative embodiments, the net 28 may include two or more regions each having a different net configuration; e.g., a first net region 29 having a first net configuration, and a second net region 31 having a second net configuration, where the second net configuration is different from the first net configuration (as shown in FIG. 20). For example, a net structure 22 that includes a mid-cord 40 may include a first net region 29 having a first net configuration disposed between the mid-cord 40 and the upper lateral edge 36/upper cord 30, and a second net region 31 having a second net configuration disposed between the mid-cord 40 and the lower lateral edge 38/bottom cord 42. To prevent escape by even the smallest animals (e.g., piglets) and/or to facilitate ingress into the trap 20, the second net configuration (including the ground portion 50 of the net structure) may comprise smaller openings 46B and smaller diameter (D2) flexible line than a first net configuration (openings 46A, flexible line diameter D1) that predominates the wall portion 48 of the net structure (i.e., openings 46B<openings 46A and D2<D1). The smaller net openings 46B can be selected to minimize the possibility of the animal becoming entangled in the net 28 (e.g., in terms of a feral pig, getting a hoof or a snout stuck in an opening 46B).

In some embodiments the net structure 22 may include a secondary wall portion 52 (i.e., an additional wall portion) that is attached to the net structure 22 between the upper and lower lateral edges 36, 38 (e.g., at the mid-cord 40 if one is included), and extends downwardly toward the lower lateral edge 38; e.g., the secondary wall portion 52 may rest on the net 28, including the ground portion 50, extending widthwise to the lower lateral edge 38, and lengthwise between the first and second lengthwise ends 32, 34—see FIG. 6. In those embodiments wherein the net structure 22 includes a secondary wall portion 52, the net opening 46 size of the secondary wall portion 52 may be smaller than the net opening 46 size of the adjacent net. In such an embodiment, the larger flexible line size (e.g., larger diameter) of the net 28 provides desirable strength to withstand impact forces, and the smaller flexible line size and smaller openings 46 of the secondary lower wall region 52 helps avoid the animal entanglement (e.g., hoof or snout entanglement, etc.). Furthermore, a secondary lower wall region 52 with a smaller flexible line size and smaller openings 46 also typically possesses greater drapability and facilitates maintaining the ground portion 50 in contact with the ground to prevent captured feral swine from escaping.

Figure 21:
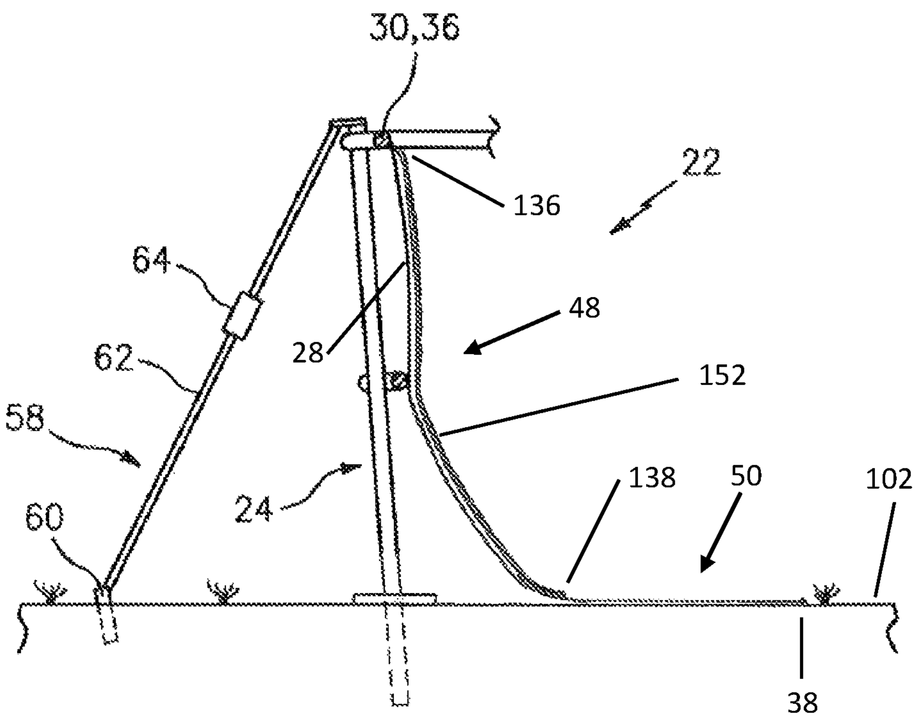
FIG. 21 is a diagrammatic side view of a portion of a present disclosure animal trap embodiment.
Figure 22:
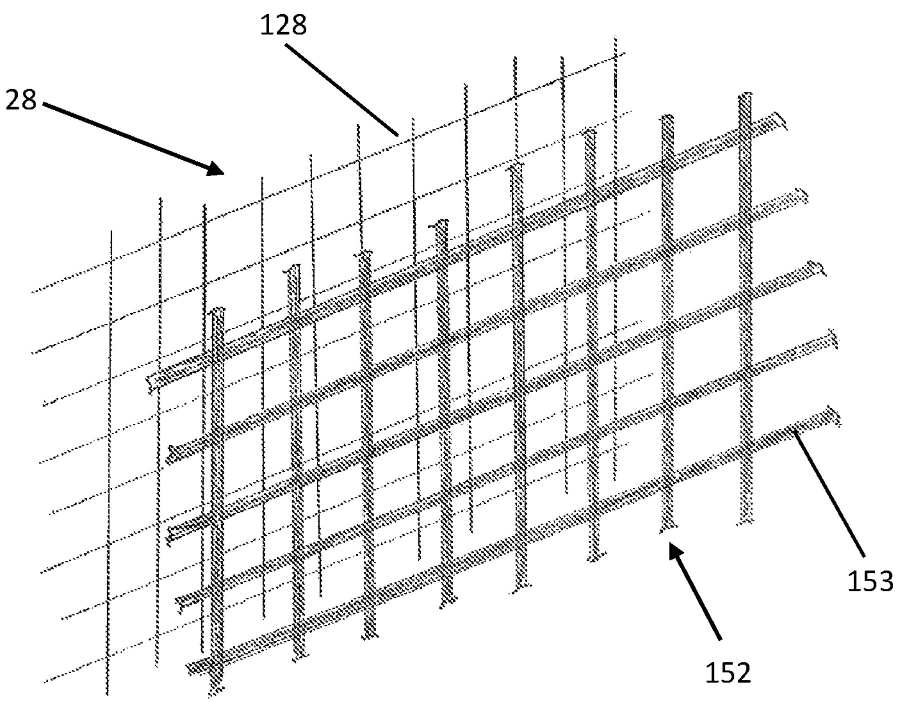
FIG. 22 is a diagrammatic perspective view of a present disclosure animal trap embodiment having a secondary wall portion attached to a net portion of a net structure.
Figure 23:
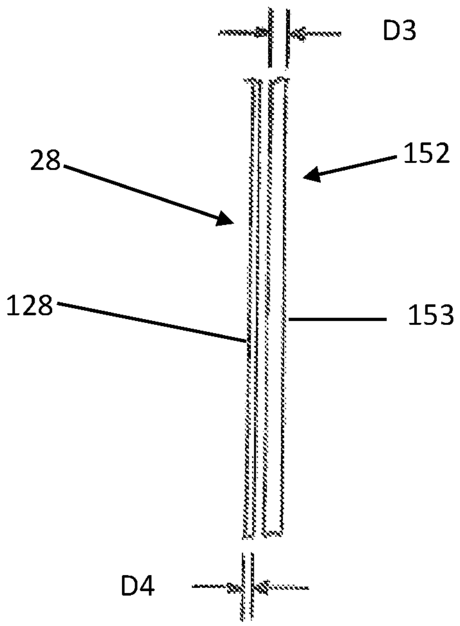
FIG. 23 is a diagrammatic side view of a present disclosure animal trap embodiment having a secondary wall portion attached to a net portion of a net structure.

Referring to FIGS. 21-23, in some embodiments the net structure 22 may include an alternative secondary wall portion 152 (i.e., an additional wall portion) that is attached to the net 28 portion of the net structure 22 between the upper and lower lateral edges 36, 38, and disposed on the side of the net 28 facing the interior region 26 of the animal trap 20 when the trap 20 is in a set configuration. The secondary wall portion 152 may be described as having an upper lateral edge 136 and a lower lateral edge 138 that are substantially parallel each other and are substantially parallel the upper lateral edge 36 of the net structure 22. The secondary wall portion 152 may be positioned relative to the net structure 22 so that the upper lateral edge 136 of the secondary wall portion 152 is disposed at or proximate the upper edge 36. The lower lateral edge 138 of the secondary wall portion 152 may be disposed such that the secondary wall portion 152 extends to the lower lateral edge 38 of the net structure 22, but preferably extends for the wall portion 48 of the net structure 22 and does not extend appreciably or at all within the ground portion 50. The secondary wall portion 152 may be attached to the net structure 22 in a variety of different ways; e.g., attached only at the upper lateral edge 136, or at additional points between the upper lateral edge 136 and the lower lateral edge 138. In some embodiments, the secondary wall portion 152 may be attached to the net structure 22 at the lower lateral edge 138. The present disclosure is not limited to any particular manner of attachment between the net structure 22 and the secondary wall portion 152; e.g., a stitched/sown attachment, a mechanical attachment, or the like. The secondary wall portion 152 may comprise the same material as the net 28 or a different material. The flexible lines 153 within the secondary wall portion 152 are configured to be at least as strong as the flexible lines 128 within the net 28, and preferably stronger. The term "strong" as used here refers to the mechanical strength (e.g., tensile strength) of the flexible lines 153 of the secondary wall portion 152; e.g., the ability to withstand an impact load (e.g., a feral hog crashing into the secondary wall portion 152). The strength of the flexible lines 153 of the secondary wall portion 152 may be attributable to the material of those flexible lines 153, or the configuration of those flexible lines 153 (e.g., the number of strands within each flexible line 153 and/or the manner of forming those flexible lines 153), or some combination thereof. The flexible lines 153 of the secondary wall portion 152 are also preferably at least as resistant to being severed or cut (e.g., resistance to being severed or cut by an animal chewing) as the flexible lines 128 of the net 28, and preferably more resistant to being severed or cut. A flexible line's resistance to being severed or cut (hereinafter referred to as "resistance to being cut" or "cut resistance") may be a product of several factors, including the amount of material (e.g., diameter), the type of material, the hardness of the material, or a treatment or coating applied to the material, or the like, or any combination thereof. As disclosed above, an acceptable net structure 22 configured for trapping feral swine will include a net 28 typically having a flexible line 128 size in the range of #18-#96 twine (i.e., a diameter range of about 1.5 mm to about 4.0 mm, or about 0.06 inches to about 0.158 inches), and having openings 46 in the range of about 0.75 inches (19.0 mm) to about 2.0 inches (50.8 mm). An example of a secondary wall portion 152 having flexible lines 153 that are stronger and more cut resistant than the flexible lines 128 of the net 28 of the net structure 22 is one having flexible lines 153 comprising the same material as the flexible lines 128 forming the net 28 but having a greater diameter. For example, the flexible lines 153 in the secondary wall portion 152 may have a diameter D3 that is in the range of about one and a half to two and a half (1.5-2.5) times larger than the diameter D4 of the flexible lines 128 that define the net 28. FIGS. 22 and 23 diagrammatically illustrate the net 28 and the secondary wall portion 152 adjacent one another to illustrate the differences in flexible line 128, 153 diameters. As stated above, the flexible lines 153 within the secondary wall portion 152 may comprise the same material as the flexible lines 128 within the net 28, or may comprise a different material. In those embodiments wherein the flexible line 128, 153 materials are different, a secondary wall portion 152 may include flexible lines 153 comprising a material that has a greater strength and/or resistance to cutting than the flexible lines 128 used in the net 28. In some embodiments, the flexible lines 153 of the secondary wall portion 152 may include metallic elements (e.g., wires, threads, or the like). The openings of the secondary wall portion 152 may be smaller or larger than the openings 46 of the net 28, or may have the same opening size.

The upper cord 30 (and one or more of the mid-cord 40, bottom cord 42, and rib cords 44 where included) may be connected to the net 28 in a variety of different ways. For example, the upper cord 30 (and other cords 40, 42, 44 as included) may be attached to the net 28 by sewn attachment; e.g., the net 28 may be configured with integral flexible lines that attach the net 28 to the upper cord 30 (e.g., see FIG. 7). A sewn connection between the cords 30, 40, 42, 44 and the net 28 is advantageous for several reasons; e.g., it does not require any independent fasteners, and can often be implemented during construction of the net structure 22. The present disclosure is not, however, limited to a net structure 22 having cords 30, 40, 42, 44 attached to the net 28 by sewn attachment. For example, any of the cords 30, 40, 42, 44 may be independent of the net 28 and may be attached to the net 28 by mechanical fasteners. Still further, any of the cords 30, 40, 42, 44 may be independent of the net 28 and weaved through the net 28 to create the connection there between.

Referring to FIGS. 5 and 6, in those trap 20 embodiments that include posts 24, the posts 24 are configured to support the net structure 22 above the ground, and to be anchored within the ground. Each post 24 may therefore be described as having a length that includes a first lengthwise portion 54 (for disposal within the ground when installed) and a second lengthwise portion 56 (for disposal above the ground when installed). The overall length of each post 24 is chosen so that the first lengthwise portion 54 is long enough to securely mount the post 24 in the ground, and the second lengthwise portion 56 is long enough to hold the net structure 22 at a height where the animal to be trapped is unable to escape over the net structure 22. A non-limiting example of an acceptable post 24 is a metal post possessing sufficient mechanical strength to support the net structure 22 during use. A specific example of an acceptable metal post is a commonly available T-post, U-post, or the like (referred to collectively hereinafter as a "T-post" to facilitate the description) that may be driven into the ground. The present disclosure is not limited to metal posts, including metal T-posts. In some instances, an alternative post (e.g., an existing tree or the like) may be used as one or more of the posts 24.

As stated above, examples of an acceptable metal post 24 include commonly available T-posts that may be driven into the ground. Conventional T-post embodiments may include a flat plate (i.e., an "anchor plate" not shown) attached to the post 24. The anchor plate has a face defined by a width and a height. The anchor plate face is attached to the T-post 24 such that the face is generally parallel to the length of the T-post 24. The edges at the bottom side of the I-post 24 (i.e., the edges closest to the T-post end to be driven into the ground) are typically angled toward one another to facilitate the anchor plate being driven into the ground. Once the anchor plate is driven into the ground, the anchor plate helps to restrain the post 24 from rotating within the ground. The anchor plate is not configured to impede the I-post 24 from being driven further into the ground.

Figure 24A:
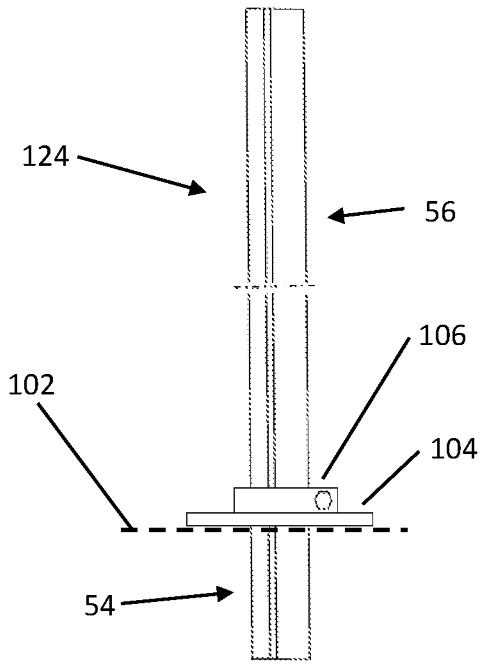
FIGS. 24A-24D are diagrammatic illustrations of modified post embodiments.
Figure 24B:
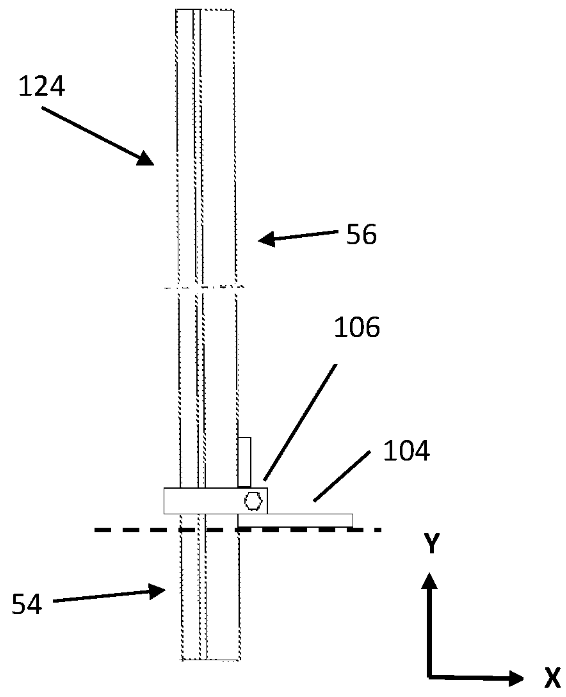
Figure 24C:
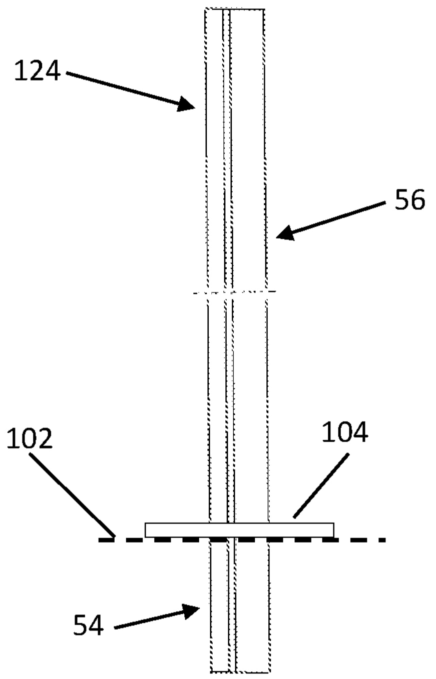
Figure 24D:
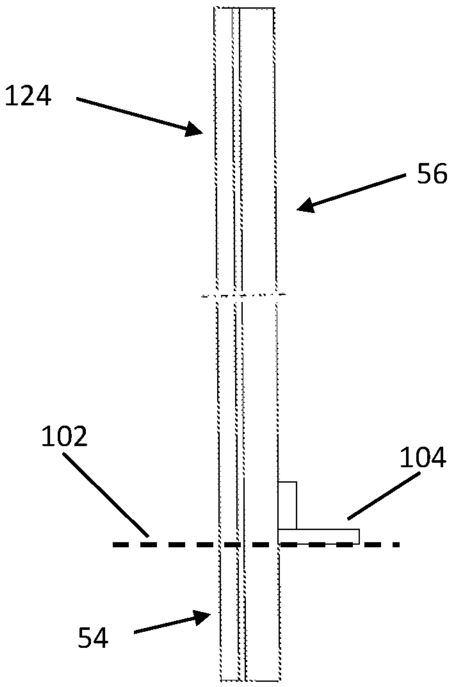
Figure 25:
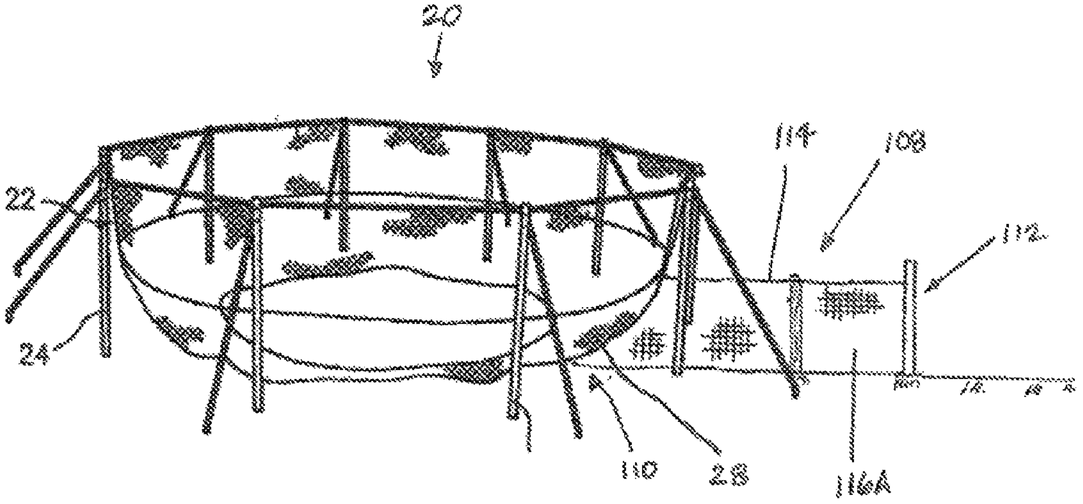
FIGS. 25 and 26 are diagrammatic representations of a present disclosure animal trap with a transfer chute.
Figure 26:
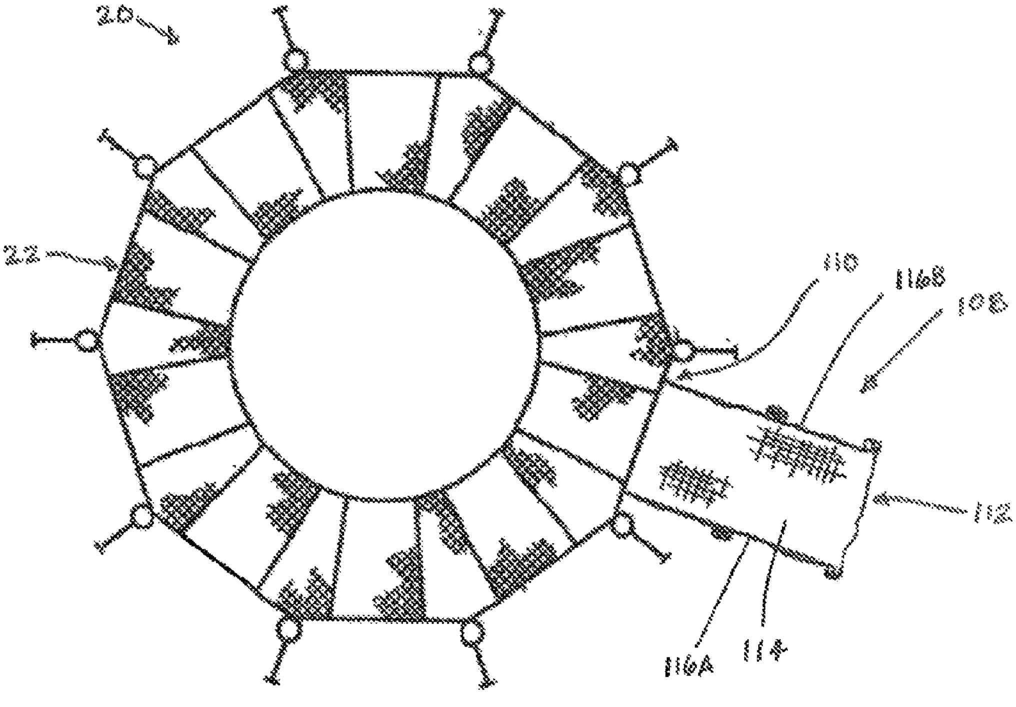
Figure 27:
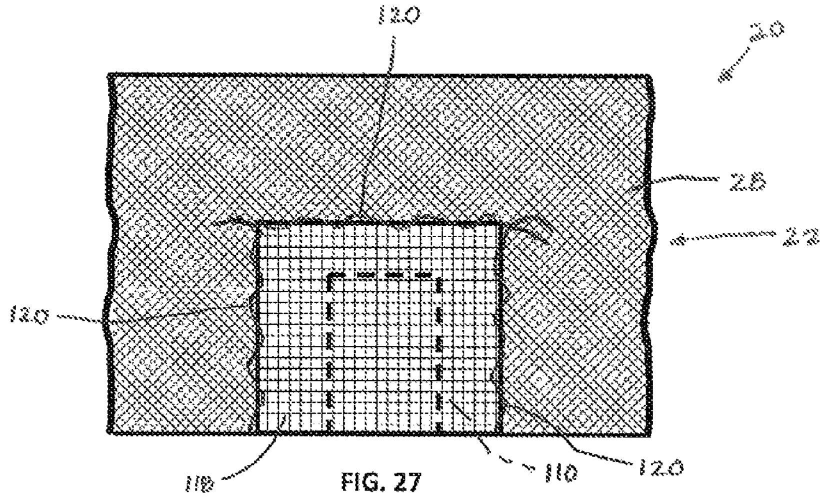
FIG. 27 is a diagrammatic representation illustrating a portion of the trap net structure and a net end cover for a transfer chute.

In some embodiments, the present disclosure includes posts 124 modified to impede or prevent the post 24 from being forced into the ground 102 beyond a predetermined distance. As will be described herein, one or more tensioning structures 58 may be used to secure a post 24, 124 to the ground 102 and to maintain the upper cord 30 in tension. The tensioning structures 58 may each include a cleat 60 (e.g., see FIG. 21) that is securable to the ground 102 and a tensioning strap 62 that can be deployed between the post 24, 124 and the ground cleat 60. When deployed, the tensioning structures 58 each pull the upper cord 30 radially outward, providing the animal trap 20 with a structural integrity having a desirable hoop strength. Each tensioning structure 58 also applies a downward force on the respective post 24, 124, helping the post 24, 124 to maintain engagement with the ground 102. Present disclosure traps 20 are configured to be utilized in a variety of different geographic locations, and these geographic locations have a range of different soil conditions; e.g., from hard, compact soil to soft soil. In geographic locations having soft soil, a tensioning structure 58 can force a post 24, 124 further into the ground 102 than desired. Embodiments of the present disclosure include modified posts 124 that are configured to permit a first lengthwise portion 54 of a modified post 124 to be disposed in the ground 102, and to inhibit the post 124 from being pulled any further into the ground 102. Referring to FIGS. 24A-D, modified posts 124 include a ground flange 104 that extends laterally outward (e.g., substantially in an X-axis direction) substantially parallel to the ground surface 102 which is typically substantially perpendicular to the lengthwise axis of the post 124. In the embodiment shown in FIGS. 24A and 24B, a clamp 106 is attached to the post 124 at about the intersection between the first lengthwise portion 54 and the second lengthwise portion 56. In the embodiment shown in FIG. 24A, the ground flange 104 may include an aperture configured to receive the post 124. The clamp 106 prevents the ground flange 104 from traveling above the clamp 106. In the embodiment shown in FIG. 24B, the ground flange 104 is attached to the post 124 by the clamp 106. The ground flange 104 shown in FIG. 24A extends around the entire periphery of the post 124, and the ground flange 104 shown in FIG. 24B extends around less than the entire periphery of the post 124. The ground flange 104 embodiments shown in FIGS. 24A and 24B are non-limiting examples of ground flange 104 configurations. For example, the clamp 106 may be configured in a manner wherein it functions as both clamp 106 and flange 104. In the embodiments shown in FIGS. 24C and 24D, the ground flange 104 is attached to the post 124 e.g., by weldment, or by mechanical attachment, or the like, thereby obviating the need for a clamp. In the process of setting up the trap 20, the modified posts 124 may be inserted into the ground 102 so that the ground flange 104 is proximate or in contact with the ground surface 102. When the tensioning structure 58 is actuated to place the net structure 22 and the post 124 in tension, the ground flange 104 inhibits or prevents the modified post 124 from moving further into the ground 102.

The potential for a post 24 to be dislodged from the ground (e.g. after multiple animal impacts, etc.) is a typically a function of factors that include the ground condition and the lengthwise portion of the post 24 (e.g., first lengthwise portion 54) disposed in the ground. A post 24 driven into compact, hard ground is less likely to be dislodged than a post 24 driven into soft ground. As is described herein, when the present disclosure trap 20 is in a set configuration it is preferable (but not required) to place the upper cord 30 of the net structure 22 in tension. If the ground conditions are hard, and the posts 24 possess sufficient mechanical strength to avoid substantial elastic deflection, it may be possible to place the upper cord 30 in tension using the posts 24 and net structure 22 alone.

Figure 7:
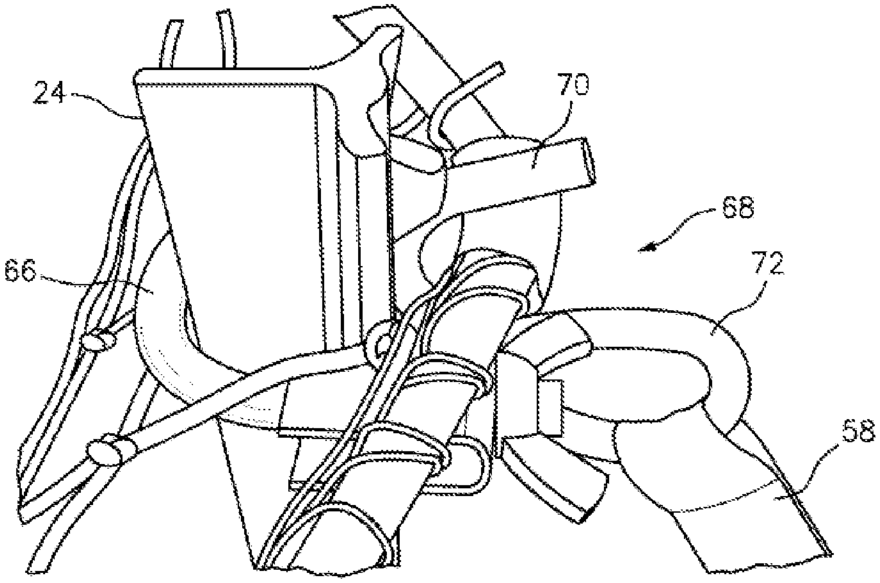
FIG. 7 is a diagrammatic view of a tensioning structure hardware embodiment, illustrating an upper cord engaged with the hardware.
Figure 8:
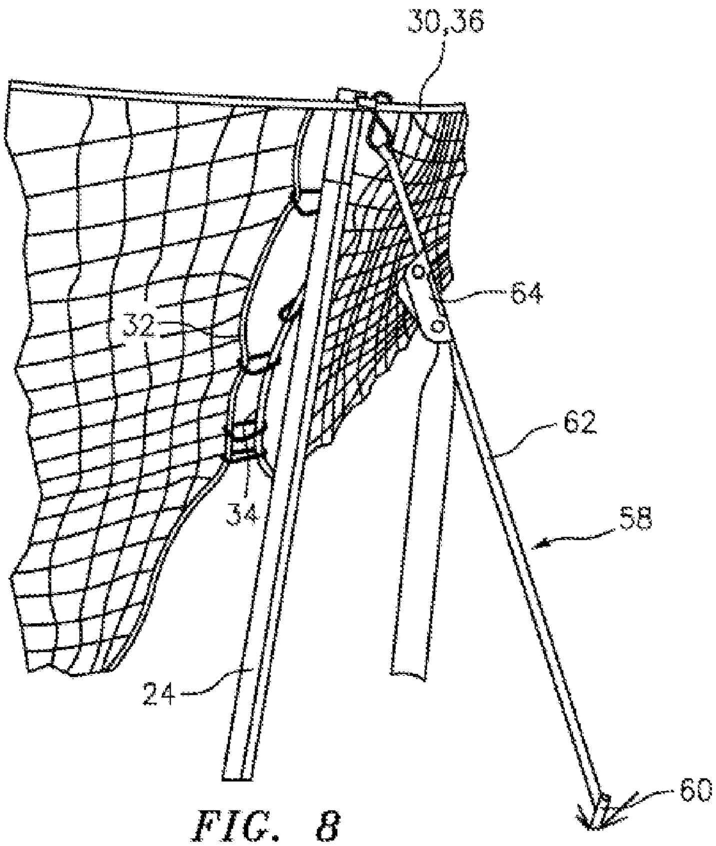
FIG. 8 is a diagrammatic partial view of a present disclosure net structure embodiment, illustrating lengthwise ends coupled together.
Figure 9:
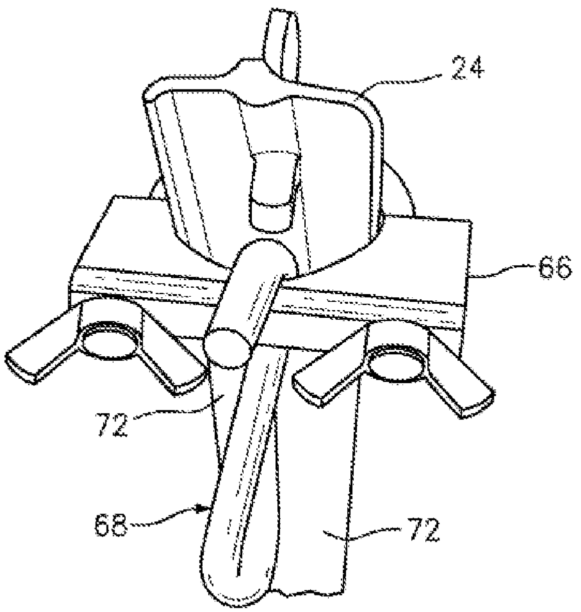
FIG. 9 is a diagrammatic view of a tensioning structure hardware embodiment.
Figure 10:
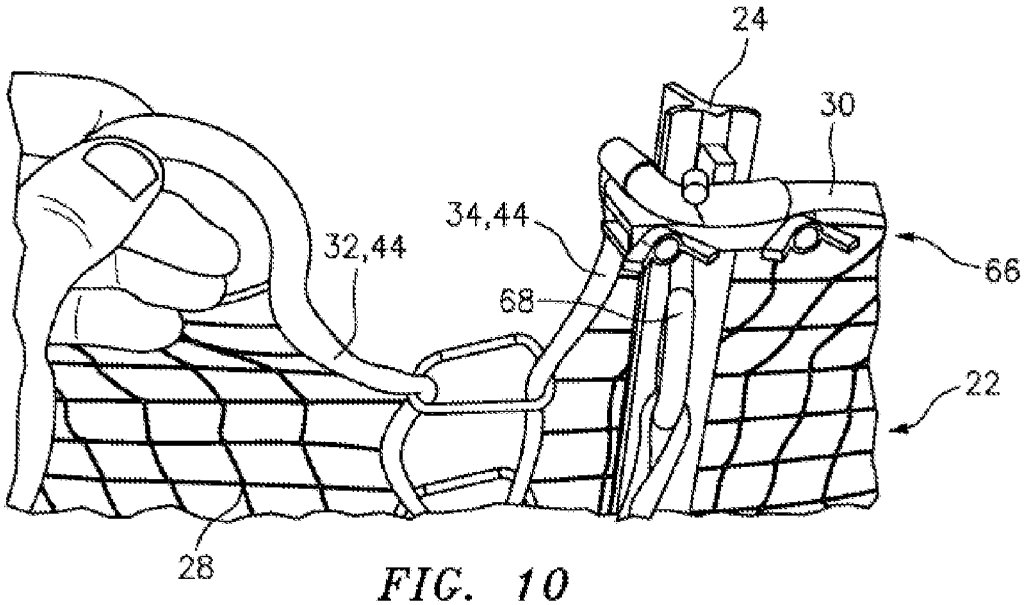
FIG. 10 diagrammatically illustrates an upper corner of the net structure looped around a post, engaged with tensioning structure hardware.

Referring to FIGS. 5, 6, and 8, in some embodiments of the present disclosure, however, the trap 20 may include tensioning structures 58 for attachment to one or more of the posts 24 to facilitate placing and maintaining the upper cord 30 in tension. In fact, the tensioning structures 58 can be used to produce the desired tension in the upper cord 30 by pulling the cord radially outward. To be clear, however, not every embodiment of the present disclosure trap 20 requires tensioning structures 58. In those embodiments that do utilize tensioning structures 58, each respective post 24 preferably has a separate tensioning structure 58. A tensioning structure 58 may include a cleat 60 that is securable to the ground and a tensioning strap 62 that can be deployed between the post 24 and the ground cleat 60. The tensioning straps 62 preferably include a mechanism 64 that can be used to decrease the length of the tensioning strap 62 (e.g., the length between the ground cleat 60 and the post 24) and thereby apply a radially outward force to the post 24. A variety of different type tensioning strap 62 materials may be used; e.g., fabric straps, rope straps, cable straps, etc. For those embodiments that include a mechanism 64 for adjusting the length of the strap 62, a variety of different mechanisms 64 can be used; e.g., ratchets, cam devices, turnbuckles, etc. The present disclosure is not limited to any particular type of tensioning strap 62 or mechanism 64 for changing the length of a strap (when included). An example of hardware that may be used to connect a tensioning strap 62 to a post 24 is shown in FIGS. 7, 9, and 10. The hardware includes a clamp 66 and a J-hook 68. The J-hook 68 shown in FIGS. 7, 9, and 10, includes an open hook portion 70 and a closed eye 72. The clamp 66 may be used to secure the open hook portion 70 to the post 24 and the tensioning strap 62 can be connected to the closed eye 72. This hardware configuration is a non-limiting example of inexpensive hardware that can be used to secure the tensioning strap 62 to the post 24. This hardware also provides a desirable means for securing the upper cord 30 to the post 24. As described below and shown in FIGS. 7 and 10, the upper cord 30 may be disposed around the exterior of the post 24 and within the open hook portion 70 to inhibit the upper cord 30 from being dislodged from the post 24.

Embodiments of the present animal trap 20 are typically configured to be assembled as a substantially circular structure. At the top of the animal trap 20 (e.g., at the upper cord 30), the "circular structure" may in fact be closer to polygonal shape dictated by the number of posts 24; e.g., an animal trap 20 that has eight posts 24 may have a substantially octagonal shape at the upper cord 30, or one having ten posts 24 may have a substantially decagonal shape (as shown in FIG. 2), etc. For ease of description herein, the shape will be referred to as a substantially circular structure having a diameter and circumference. The maximum diameter/circumference of the animal trap 20 is at the upper cord 30/upper lateral edge 36. In the set configuration, the net structure 22 initially extends substantially downwardly away from the upper cord 30, and then arcuately transitions radially inward, with the ground portion 50 disposed on the ground, terminating at the lower lateral edge 38. As indicated herein, the lower lateral edge 38 defines the trap opening 27. As a result, diameter/circumference of the net structure 22 at the lower lateral edge 38 (i.e., at the trap opening 27) is substantially smaller than the diameter/circumference at the upper lateral edge 36/upper cord 30. To accommodate the differences in diameter/circumference, at least a portion of the net structure 22 (e.g., the ground portion 50) may have a tapered configuration that produces the smaller diameter at the lower lateral edge 38; e.g., see FIG. 3. Alternatively, the net structure 22 may have the same circumferential length at the upper cord 30 and at the lower lateral edge and portions 74 of the ground portion 50 may be "cinched up" (e.g., folded over onto itself and coupled with fasteners—see FIG. 3A) to create a smaller diameter/circumference at the lower lateral edge 38 (i.e., a smaller diameter/circumference trap opening 27). The difference in diameter/circumferential length between the upper lateral edge 36/upper cord 30 and the lower lateral edge 38 helps to maintain the ground portion 50 of the net structure 22 in contact with the ground, and helps to prevent any section of the net structure 22 from being pushed radially outward beyond the posts 24.

In those net structure 22 embodiments that include a mid-cord 40, the diameter/circumference of the net structure 22 at the mid-cord 40 may be less than the diameter/circumference of the net structure 22 at the upper cord 30. A smaller net structure 22 diameter/circumference at the mid-cord 40 may assist in creating an inward radial curvature of the net structure 22 (e.g., see FIGS. 5 and 6) that facilitates animal entry into the trap 20 as will be described below.

In some embodiments, the net structure 22 has independent lengthwise ends 32, 34 that can be brought together to close the circumference of the animal trap 20. In other embodiments, the net structure 22 may have a "closed" configuration, wherein the net structure 22 is formed with lengthwise ends 32, 34 that are attached to one another, not purposefully separable. An advantage of present disclosure animal traps 20 having a net structure 22 with independent lengthwise ends 32, 34 is that the net structure 22 can be disposed around natural features present where the trap 20 is being set up; e.g., a tree and/or brush can be disposed in the interior region 26 of the trap 20, and the trap 20 closed around them.

In those embodiments wherein the lengthwise ends 32, 34 of the net structure 22 are independent of one another, the lengthwise ends 32, 34 of the net structure 22 may be attached to one another in an abutting manner to close the net structure 22 (e.g., see FIG. 8). Alternatively, the net structure 22 may be set up with portions of the net structure 22 adjacent the lengthwise ends 32, 34 overlapping one another, with each lengthwise end attached to the net structure 22 (e.g., at a rib cord 44). The ability of the net structure 22 to be set up with portions of the net structure 22 overlapping one another, permits the user to alter the diameter/circumference of the animal trap 20.

Figure 11:
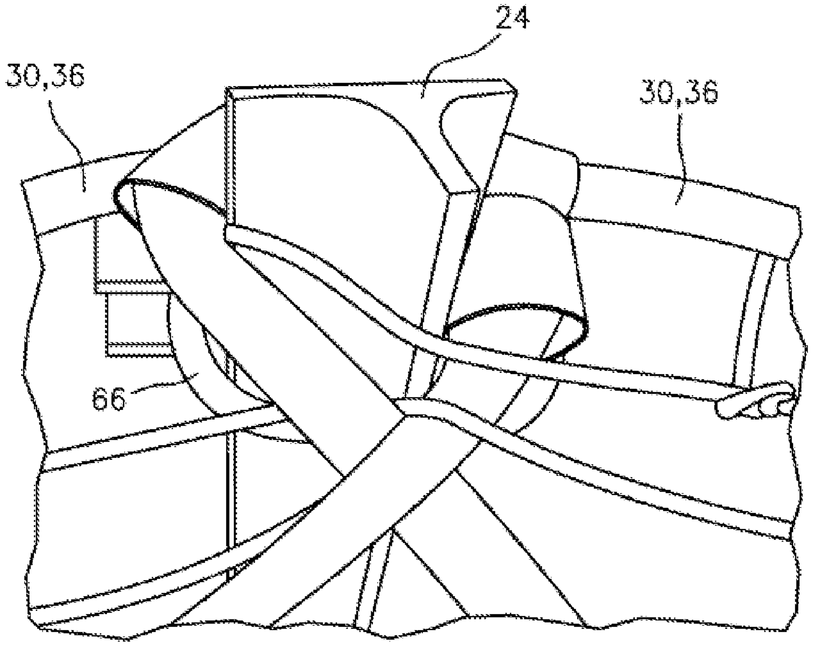
FIG. 11 diagrammatically illustrates both upper corners of the net structure looped around a post, engaged with tensioning structure hardware.

Regardless of whether the animal trap 20 is set up so that the lengthwise ends 32, 34 of the net structure 22 abut or overlap one another, the upper cord 30 is configured to create a fixed circumference. For example, as shown in FIGS. 10 and 11, the net structure 22 may be configured with a rib cord 44 disposed at each lengthwise end 32, 34 that is connected to the upper cord 30 (e.g., the rib cord 44 is integral with the upper cord 30), thereby forming an upper corner of the net structure 22. In these embodiments, the upper corner of the net structure 22 at each lengthwise end 32, 34 is looped around the exterior of a post 24. In those embodiments that use the J-hook 68 hardware, the upper corner of each lengthwise end 32, 34 may be captured within the open hook portion 70 of the J-hook 68 to inhibit the upper cord 30 from being dislodged from the post 24. Alternatively, mechanical fasteners (e.g., snap clips, carabiner clips, clamps, or the like) may be used to attach the upper cord 30 to itself to establish the fixed circumference.

When the upper cord 30 is configured with a fixed circumference and placed in tension, the upper cord 30 gives the animal trap 20 a structural integrity with a desirable hoop strength. As stated above, in some instances the posts 24 may be installed in such a fashion that no tensioning structures 58 are required, and the upper cord 30 may be placed in tension around the posts 24. In other instances, tensioning structures 58 may be used to draw the posts 24 radially outward and thereby place the upper cord 30 in tension. Regardless of how the upper cord 30 is tensioned, the tension produces circumferential stress (sometimes referred to as "hoop stress") within the upper cord 30. The circumferential stress gives the upper cord 30, and therefore the net structure 22, a hoop structural integrity that resists forces acting on the net structure 22; e.g., radially outward forces produced by animals trapped within the interior region 26 of the trap 20 impacting a segment of the net structure 22. Although a portion of the net structure 22 impacted by an animal may deflect radially outward to a limited degree, the hoop configuration of the net structure 22 distributes some amount of the impact energy to the circumferential remainder of the net structure 22.

Additional mechanical fasteners may be used to hold the remainder of the lengthwise ends 32, 34 of the trap 20 between the upper lateral edge 36 and the lower lateral edge 38 together; e.g., see FIG. 8. There are a variety of different ways in which the lengthwise ends 32, 34 may be held together, and the present disclosure is not, therefore, limited to any particular configuration for holding the lengthwise ends 32, 34 together.

Figure 12:
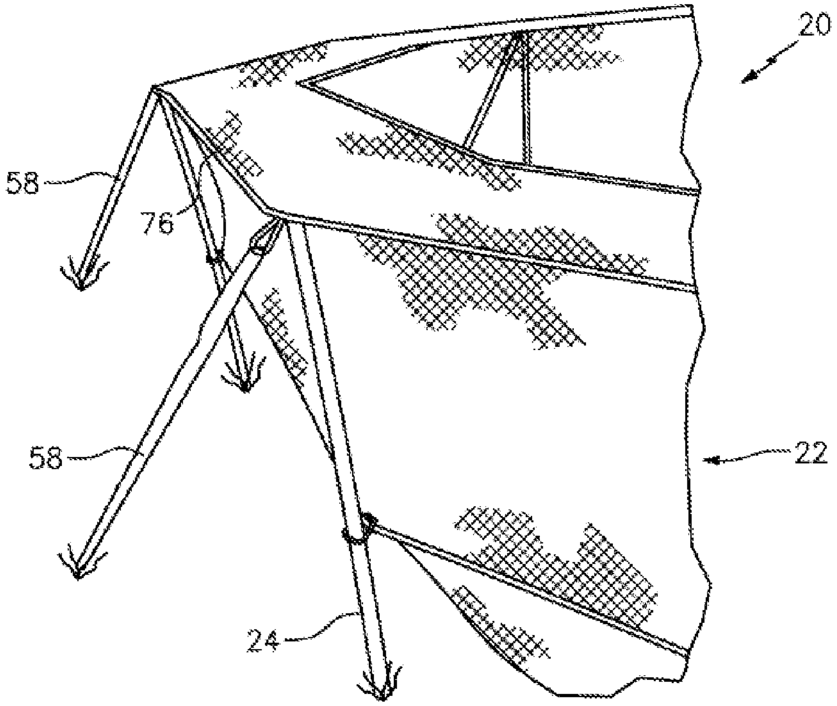
FIG. 12 diagrammatically illustrates an upper edge panel embodiment.
Figure 13:
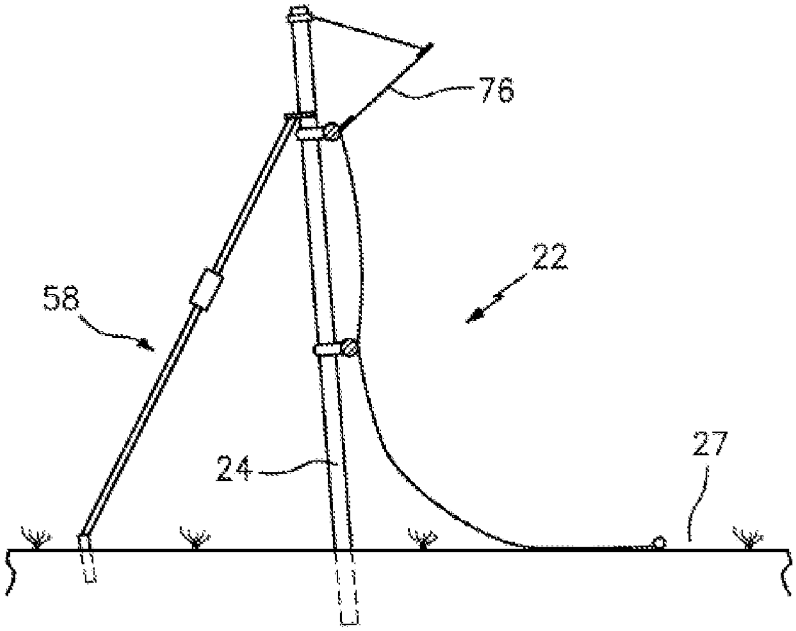
FIG. 13 diagrammatically illustrates an upper edge panel embodiment.

Referring to FIGS. 12 and 13, in some embodiments the animal trap 20 may include an upper edge panel 76 that extends around the circumference of the trap 20, and extends a distance radially inward from the upper cord 30 to inhibit any attempt by a trapped animal to exit the trap 20 over the net structure 22. In the embodiment shown in FIG. 12, the upper edge panel 76 is attached around the circumference of the animal trap 20 and placed in tension. As a result, the upper edge panel 76 resides substantially horizontal. In the embodiment shown in FIG. 13, the upper edge panel 76 is attached around the circumference of the animal trap 20 adjacent the upper cord 30, and is also attached to each post 24 at a position above the upper cord 30. As a result, the upper edge panel 76 extends both radially inwardly and upwardly. The embodiments shown in FIGS. 12 and 13 are provided to show non-limiting examples of how an upper edge panel 76 may be configured, and the present disclosure is not limited thereto.

FIG. 14 illustrates an embodiment of the present disclosure that includes a structural ring 78 disposed at the upper lateral edge 36 of the trap. The structural ring 78 (e.g., made of tubing, or a solid rod) may be used as an alternative to the upper cord 30, with the upper lateral edge 36 of the net structure 22 attached to the structural ring 78. The structural ring 78 may be produced in circumferential subsections for ease of transport/storage, and those circumferential subsections attached to one another on-site to form the structural ring 78.

Figure 15:
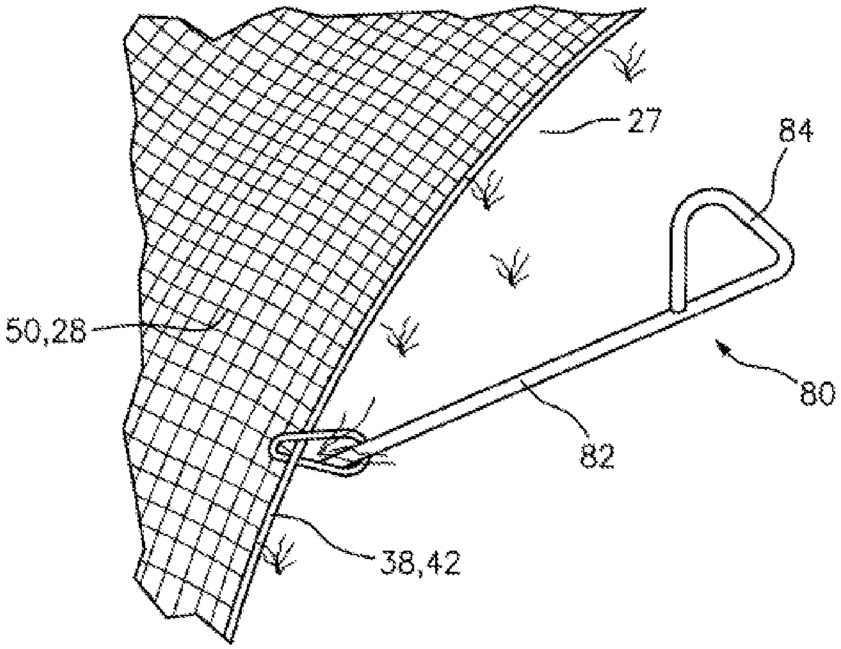
FIG. 15 illustrates an anchor stake embodiment securing a lower lateral edge of the net structure.
Figure 16:
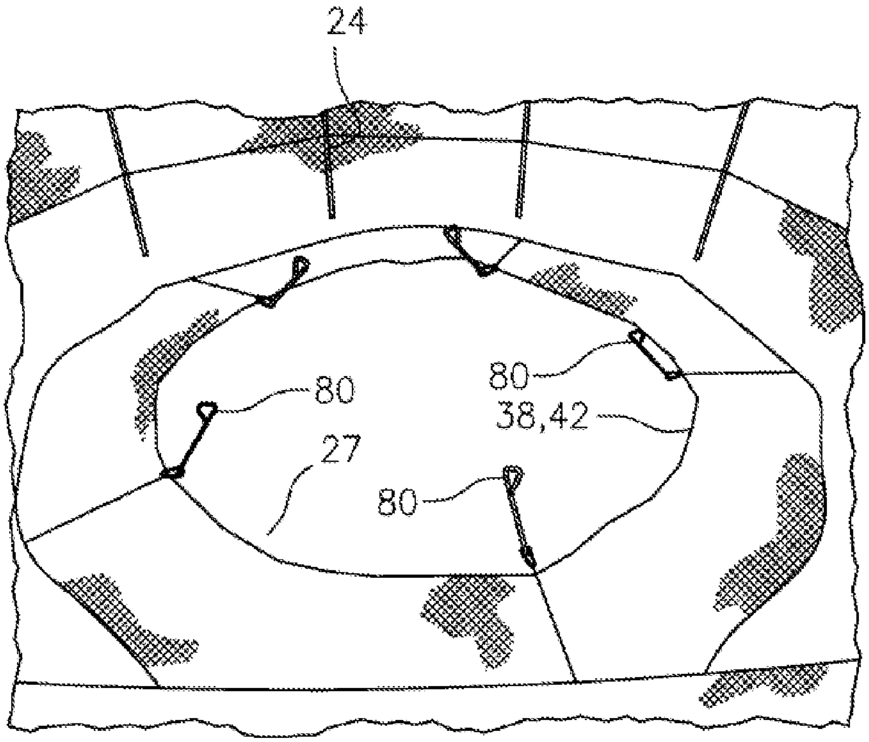
FIG. 16 illustrates a plurality of anchor stakes securing the lower lateral edge of a net structure in a central location of the trap.

In some embodiments, the animal trap 20 may include one or more anchoring devices configured for engagement with the lower lateral edge 38 and operable to assist in maintaining the position of the ground portion 50 of the net structure 22. A non-limiting example of an anchoring device is an anchor stake 80 that can be deployed at the lower lateral edge 38 to assist in maintaining the position of the ground portion 50 of the net structure 22. FIGS. 15 and 16 illustrate an example of an acceptable anchor stake 80, having a body 82 and a head 84 disposed at one end of the body 82. Mechanical fasteners (e.g., snap clips, carabiner clips, or the like) may be used to connect the lower lateral edge 38 to the respective anchor stake 80. The body 82 is configured to be received within the mechanical fastener and can be driven into the ground. The head 84 of each anchor stake 80 is preferably configured so that the mechanical fastener cannot pass over the head 84. Alternatively, the body 82 of each anchor stake 80 can be configured to pass through an opening 46 in the net 28, and the head 84 configured so it cannot pass through an opening 46 in the net 28 (thereby obviating the need for fasteners). In the installed position, the net 28 is allowed to slide up and down the anchor stakes 80. The anchor stakes 80 ensure that the ground portion 50 remains positioned towards the center of the trap interior region 26. The present disclosure is not limited to anchor stakes 80, and other anchoring devices may be used alternatively. For example, the lower lateral edge 38 may be attached to cleat driven into the ground. A rope (or cord, cable, etc.) loosely connected to the lower lateral edge 38 will allow the net 28 is be pushed upwardly when the animal enters the trap, but will limit the travel of the lower lateral edge away from the center of the trap 20.

As is clear from above, the present disclosure animal trap 20 embodiments are readily portable and can be transported to regions both accessible and inaccessible by conventional vehicles (e.g., cars, SUVs, trucks, etc.). Once a trap site is selected, the perimeter of the animal trap 20 may be established and the posts 24 installed in the ground. As stated above, in some instances a "natural" post (e.g., an existing tree or the like) may be used as one or more of the posts 24.

Figure 17:
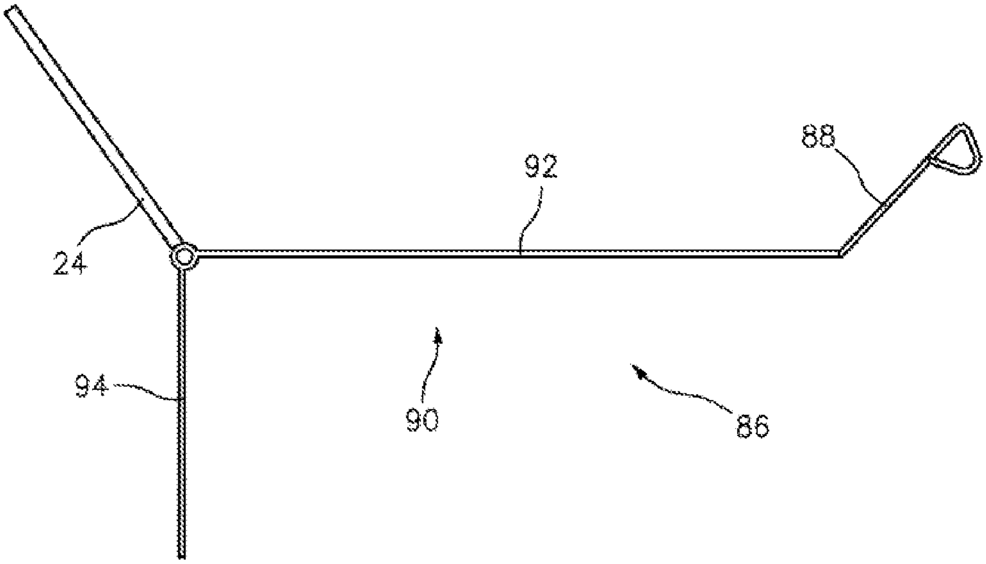
FIGS. 17 and 18 illustrate a tool for location posts.
Figure 18:
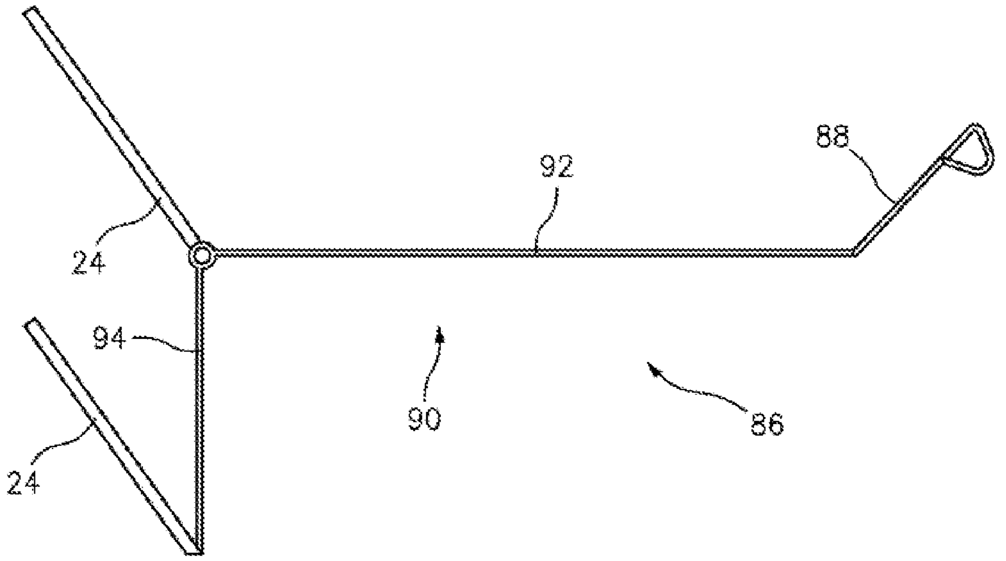

Referring to FIGS. 17 and 18, some embodiments of the present disclosure trap are provided with a tool 86 for spacing the posts 24 apart from one another and facilitating the installation of the trap 20. The tool 86 utilizes a center stake 88 driven into the ground at the geometric center of the trap 20, and a measuring strap 90. The measuring strap 90 includes a radial member 92 and a circumferential member 94. A pivot ring is disposed at one end of the radial member 92, and one end of the circumferential member 94 is attached to the opposite end of the radial member 92. To install the first post 24, the pivot ring is disposed around the center stake 88 for pivotal movement. The radial member 92 is pulled taut radially outward. The outer end of the radial member 92 defines a first post 24 position. To establish a second, adjacent post 24 position, an end of the circumferential member 94 (opposite the end attached to the radial member 92 is connected to the first post 24. The radial member 92 and the circumferential member 94 are drawn taut (now substantially "L" shaped), and the point of attachment between the radial member 92 and the circumferential member 94 defines the next post 24 position. This process is repeated until all of the posts 24 are located and installed into the ground. The post to post spacing is typically chosen based on the application (i.e., what animal is to be trapped), and more specifically the post to post spacing is chosen to facilitate animal entry, but close enough to prevent escape.

Once the posts 24 are installed, the net structure 22 may be drawn around the trap circumference established by the installed posts 24, the lengthwise ends 32, 34 of the net structure 22 attached to one another (e.g., by mechanical fasteners), and the upper cord 30 may be attached to the posts 24 as described above; e.g., looped around the exterior of the respective post 24. In those embodiments that include J-hooks 68, the upper cord 30 may be disposed in the open hook portion 70 of the J-hook 68 to inhibit the upper cord 30 from being dislodged from the post 24. If J-hooks 68 are not utilized, an alternative mechanism may be used to maintain the upper cord 30 at the desired position on the post 24. Once the upper cord 30 is attached to all of the posts 24, the upper cord 30 may be drawn into tension; e.g., by using the tensioning structures 58 in a coordinated manner to draw the upper cord 30 of the net structure 22 into tension and provide the desirable hoop strength.

The lower lateral edge 38 of the net structure 22 may be positioned centrally in the interior of the trap 20 before or after the upper cord 30 is brought into tension. In those embodiments that utilize anchor stakes 80 (or other anchoring device), a number of anchor stakes 80 adequate to centrally maintain the lower lateral edge 38 are installed, but not so many so as to inhibit animal ingress into the trap 20. Typically, an anchor stake 80 disposed every other post 24 works well. As stated above, mechanical fasteners (e.g., snap clips, carabiner clips, or the like) may be used to connect the lower lateral edge 38 to the respective anchor stake 80. Once the anchor stakes 80 are installed, the net 28 is allowed to slide up and down the anchor stakes 80, and the heads 84 of the stakes 80 prevent the net 28 from dislodging.

In those embodiments that include a mid-cord 40, the mid-cord 40 may be connected to each post 24 by a mechanical fastener (e.g., a ratchet strap; see FIG. 8). Preferably, the fastener is configured so that the mid-cord 40 can move lengthwise some amount during use of the animal trap 20 and the net structure 22 at the mid-cord 40 is therefore not fixed to the post 24; i.e., the mid-cord 40 is able to slide some amount. Advantages of this type of connection are described below.

Figure 19:
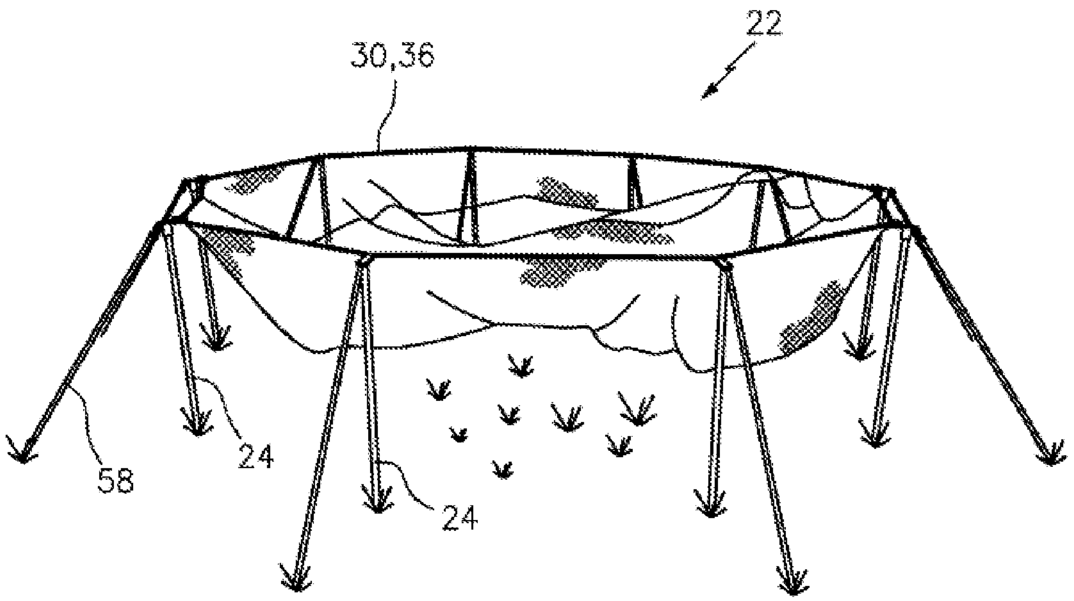
FIG. 19 diagrammatically illustrates a present disclosure animal trap in a pre-set configuration.

After the animal trap 20 is initially set up, the net structure 22 may be configured in a "pre-set" configuration that allows the animals to travel under the net structure 22 (i.e., all or only portions of the net 28 may be held up off the ground) and therefore into and out of the trap 20 interior region 26 without obstruction. e.g., see FIG. 19. Bait placed on the ground in the interior region 26 of the trap 20 will draw the animals into the trap 20. The process of maintaining the trap 20 in a pre-set configuration with bait disposed in the trap 20 interior region 26 will allow the animals to become accustomed to the trap 20. In the case of feral swine, it is known that feral swine are intelligent animals that are very cautious around unknown structures. Pre-setting the trap 20 often greatly improves the number of animals that can be caught in a single setting simply by improving the confidence of the animals relative to the trap 20. Pre-setting is not required, however, for the present disclosure animal trap 20 to work effectively.

Once the operator is ready to capture animals, some amount of bait is disposed in the interior region 26 of the trap 20 and the net structure 22 is closed (e.g., the lengthwise ends 32, 34 of the net structure 22 attached to one another, and the ground portion 50 secured to the ground; i.e., the set configuration). As can be seen in FIGS. 1, 5, and 6, in this set configuration, at least a portion of the wall portion 48 curves radially inwardly and eventually contacts the ground. The lower lateral edge 38 in contact with the ground defines the trap opening 27. The inward radial curvature of the wall portion 48 is understood to facilitate animal entry into the trap 20. The collapsible, flexible, and lightweight nature of the net structure 22 allows animals to work their way under the net structure 22 with minimal resistance, past the lower lateral edge 38 of the net structure 22 and through the trap opening 27 to access the bait. Feral swine, in particular, naturally root with their snouts, and this rooting behavior will naturally raise some of the wall portion 48 and the ground portion 50, thereby providing access to the interior region 26 of the animal trap 20 via the trap opening 27. Once the animal has traveled completely under the net structure 22, gravity causes the net structure 22 to fall back to the ground and the animal is trapped. In contrast to solid cage traps or corral traps formed from stiff wire fencing that only permit ingress through a particular door structure, the present disclosure trap 20 allows an animal to enter the trap 20 at any circumferential position of the trap 20. This aspect is believed to increase the confidence of the animals being trapped and consequently the yield of the trap 20.

As can be seen from the description above, some present disclosure animal trap 20 embodiments—once set up—do not require any human intervention. This is in direct contrast to corral or box trap systems that require an operator to actuate the trap door to trap the animals.

Once the animals are trapped, it is not uncommon for the animals to attempt to escape the trap 20. As indicated above, these attempts often take the form of charging the net structure 22 or attempting to chew through the net structure 22. The hoop strength of the animal trap 20 created by tensioning the upper cord 30 (or using a structural ring 78) inhibits the trapped animals from knocking down any portion of the trap 20. In the case of feral swine, the impacts are typically in the wall portion 48 of the net structure 22. In those embodiments that include a mid-cord 40, the tensioning of the mid-cord 40 may be less than that of the upper cord 30, and the fasteners connecting the mid-cord 40 to the posts 24 allow the mid-cord 40 to slide/travel circumferentially to some degree. As a result, the portion of the net structure 22 impacted by the animal deflects radially outwardly and dissipates at least a part of the impact energy. In addition, however, the mid-cord 40 which extends the entire circumference of the trap 20 also distributes some amount of the impact energy to posts 24 beyond the impact area. Hence, the posts 24 collectively operate to maintain the structural integrity of the trap 20; not just the posts 24 adjacent to the impact region. In addition, as the animal approaches the net structure 22, the animal will likely step on the ground portion 50 and their weight will help to anchor the net structure 22 to the ground.

The height of the net structure 22 above the ground is typically great enough so that the animal has no chance of jumping over the wall of the trap 20. In the case of a trap 20 configured to catch feral swine, a wall height of four to eight feet (i.e., 4-8 ft.; 122-244 cm) is typically sufficient. However, as stated above, some embodiments of the present disclosure may include an upper edge panel 76 that extends radially inwardly to increase the difficulty of escape over the wall of the animal trap 20.

Alternative embodiments of the present disclosure animal trap 20 can be configured to be selectively actuable by an operator. For example, some trap 20 embodiments may include one or more actuating devices that hold at least a portion of the net structure 22 off the ground and thereby allow unimpeded access into the interior of the trap. Once a sufficient number of animals are located in the interior region 26 of the trap 20, the actuating devices may be actuated by the operator and the net structure 22 released, allowing it to fall to the ground. The present disclosure is not limited to any particular type of actuating device.

The present disclosure animal trap 20 is substantially lighter than known animal traps configured to trap similar animals. Known feral swine traps are typically made of wood and/or metal and often weigh hundreds of pounds, and are difficult to transport. The present disclosure animal trap 20 is a small fraction of the weight and can be compactly packaged for easy storage or transport. The present disclosure animal trap 20 is substantially less expensive than known animal traps configured to trap similar animals. The net structure 22 of the present disclosure animal trap 20 can enclose a substantial trap area at a much lower cost than solid member cage traps or hardwire corral traps, and does not require an intricate actuable door assembly. The present disclosure animal trap 20 is substantially more versatile than known animal traps configured to trap similar animals. The present disclosure animal trap 20 does not require the trap area to be cleared, and can be used on sloped ground. In fact, the ability of the present animal trap 20 to be used in a vegetated area likely will improve the effectiveness of the trap 20 since the setting is more "natural" and the trap 20 less apparent to the animals being trapped.

Feral hogs may be captured in a present disclosure animal trap for a variety of different reasons. Very often the feral hogs are trapped for purposes of eliminating the swine and therefore the environmental problems they create. In these instances, an animal trap 20 user may elect to euthanize the animals while they are present within the trap 20. In some instances, however, it may be desirable to remove the feral hogs from the animal trap 20 while the animals are alive for study, remote euthanization, etc. In those instances where it is desirable to remove the trapped animals from the present disclosure trap 20 alive, embodiments of the trap 20 may include a transfer chute 108 configured to allow the animal to egress from the animal trap 20.

Referring to FIGS. 25-29, a transfer chute 108 is provided that includes a net end 110 and a terminal end 112. The net end 110 of the transfer chute 108 is attached to the net structure 22; e.g., attached to the net 28. Embodiments of the transfer chute 108 may include a top panel 114, a first side panel 116A, and a second side panel 116B (all connected to one another) that collectively form an interior passage that extends from the net end 110 to the terminal end 112. In some embodiments, the transfer chute 108 may include a ground panel extending between the side panels 116A, 116B. The transfer chute 108 may be described as having a height that extends from the ground to the top panel 114, a width that extends between the side panels 116A, 116B, and a length that extends from the net end 110 to the terminal end 112. The transfer chute 108 panels may comprise netting (e.g., netting configured the same as the net 28 used within the net structure 22), or may comprise a solid material (preferably non-transparent), or a combination of netting and a solid material. Based on field experience, applicant understands that a transfer chute 108 that includes netting (for strength) covered in a non-transparent material works well. It is theorized that the feral hogs traveling through a non-transparent material enclosed transfer chute 108 see the open light terminal end 112 and are motivated to travel entirely through the chute rather than dwell within the transfer chute 108 after exiting the animal trap 20.

In some embodiments, the transfer chute 108 may include a net end cover 118 (e.g., see FIG. 27) that prevents an animal trapped within the animal trap 20 from entering the transfer chute 108 until the trap operator selectively allows entry. The net end cover 118 may have a generally rectangular shape defined by a bottom edge and a top edge, with a pair of side edges extending there between. An example of a net end cover 118 is a panel that covers the entirety of the net opening 110 and is attached to the net structure 22. For example, the bottom edge of the net end cover 118 may be attached to the net structure 22 at a position within the ground portion 50; e.g., at or adjacent the lower lateral edge 38. The side edges extend away from the bottom edge (e.g., toward the top of the animal trap 20) to the top edge. The side edges and the top edge are releasably attached to the net structure 22/net 28; e.g., by cords 120 that intertwine the net end cover 118 with the net 28 and that may be drawn clear of the net 28 to release the net end cover 118. Once the cords 120 are released, the net end cover 118 is allowed to gravitationally drop thereby exposing access to the transfer chute 108.

Figure 28:
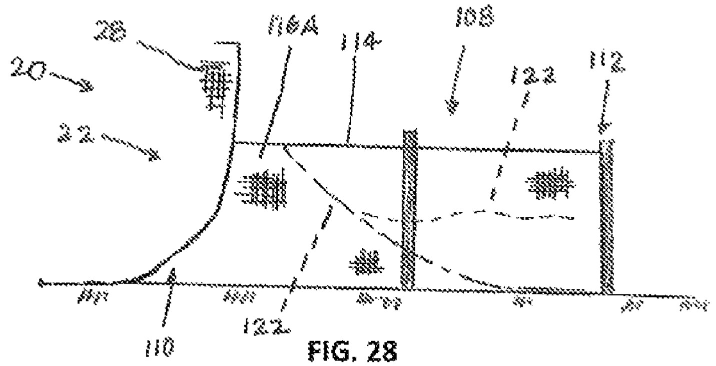
FIG. 28 is a diagrammatic representation illustrating a portion of the trap net structure and a transfer chute.
Figure 29:
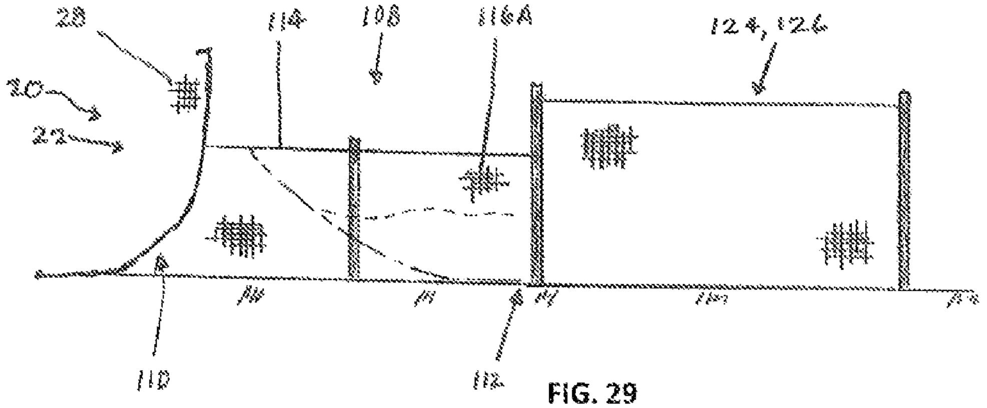
FIG. 29 is a diagrammatic representation illustrating a portion of the trap net structure, a transfer chute, and a handling chute/transitional chute.

In some embodiments, the transfer chute 108 may include an interior gate panel 122 (e.g., se FIGS. 28 and 29) that is configured to permit animal travel from the net end 110 to the terminal end 112, and to inhibit or prevent animal travel back toward the net end 110. For example, the gate panel 122 may be configured such that a top end of the gate panel 122 is attached to the top panel 114 of the chute 108 and the distal end of the gate panel 122 may gravitationally reside on the ground or ground panel. FIGS. 28 and 29 diagrammatically show the gate panel 122 distal end residing on the ground and elevated above. The gate panel 122 extends lengthwise within the transfer chute 108 in a manner similar to the net structure 22 of the animal trap 20. A feral hog traversing the transfer chute 108 is able to push the gate panel 122 upward by rooting behavior. Once the feral hog has passed beyond distal end of the gate panel 122, the distal end gravitationally falls to the ground and access back to the trap 20 is prevented or at least significantly impeded. In some embodiments, the transfer chute 108 may be configured so that the gate panel 122 can be held aloft by a retainer (e.g., a cord) and released once the feral hog has past the gate panel 122 distal end. Weights may be attached to the distal end of the gate panel 122 to facilitate the return to ground and maintaining the distal end on the ground.

The transfer chute 108 may be configured for connection with a handling chute 124 (e.g., a relatively long enclosed passage wherein feral hogs can be accessed by users for tagging or tranquilizing, etc. The transfer chute 108 may also be configured for connection with a transitional chute 126 configured to mate with a container that can be used to contain the animals for subsequent transportation to a remote location, or to mate with a vehicle or trailer for subsequent for transportation.

An advantage of the present disclosure transfer chute 108, handling chute 124, and/or transitional chute 126 is that they are portable; e.g., each can be readily folded for storage and transportation.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

The term "about" is intended to include the degree of error associated with measurement of the particular quantity based upon the equipment available at the time of filing the application.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A flexible net structure, comprising:

a collapsible net formed from a plurality of spaced apart first flexible lines, the net having a width that extends between a collapsible net upper lateral edge and a collapsible net lower lateral edge, a first length that extends between a first lengthwise end and a second lengthwise end at the collapsible net upper lateral edge, and a second length that extends between the first lengthwise end and the second lengthwise end at the collapsible net lower lateral edge;

a flexible upper cord attached to the collapsible net at the collapsible net upper lateral edge extending the first length of the net;

a flexible bottom cord attached to the collapsible net at the collapsible net lower lateral edge, wherein the flexible bottom cord has a bottom cord diameter and each said first flexible line has a first flexible line diameter, and the bottom cord diameter is greater than the first flexible line diameter;

wherein the collapsible net includes a wall portion and a ground portion, the wall portion extends from the flexible upper cord to the ground portion and the ground portion extends from the collapsible net lower lateral edge to the wall portion;

wherein the flexible net structure is configurable in a closed configuration where the first lengthwise end and the second lengthwise end are disposed proximate each other, and the collapsible net lower lateral edge defines a trap opening; and a secondary net formed from a plurality of spaced apart second flexible lines, the secondary net attached to the flexible net structure in the wall portion of the flexible net structure, extending between the collapsible net first lengthwise end and the collapsible net second lengthwise end.

2. A flexible net structure, comprising:

a collapsible net formed from a plurality of spaced apart first flexible lines that define a plurality of openings within the net, the net having a width that extends between a collapsible net upper lateral edge and a collapsible net lower lateral edge, a first length that extends between a first lengthwise end and a second lengthwise end at the collapsible net upper lateral edge, and a second length that extends between the first lengthwise end and the second lengthwise end at the collapsible net lower lateral edge;

a flexible upper cord attached to the collapsible net at the collapsible net upper lateral edge extending the first length of the net;

a flexible bottom cord attached to the collapsible net at the collapsible net lower lateral edge, wherein the flexible bottom cord has a bottom cord diameter and each said first flexible line has a first flexible line diameter, and the bottom cord diameter is greater than the first flexible line diameter;

wherein the collapsible net includes a wall portion and a ground portion, the wall portion extends from the flexible upper cord to the ground portion and the ground portion extends from the collapsible net lower lateral edge to the wall portion;

wherein the flexible net structure is configurable in a closed configuration where the first lengthwise end and the second lengthwise end are disposed proximate each other, and the collapsible net lower lateral edge defines a trap opening; and a secondary net formed from a plurality of spaced apart second flexible lines that define a plurality of openings within the secondary net, the secondary net attached to the flexible net structure in the wall portion of the flexible net structure, extending between the collapsible net first lengthwise end and the collapsible net second lengthwise end.

3. The flexible net structure of claim 2, wherein the first flexible lines consist of a first polymeric material and the upper cord consists of a second polymeric material.

4. The flexible net structure of claim 3, wherein the second flexible lines consist of a third polymeric material.

5. The flexible net structure of claim 2, wherein the upper cord has an upper cord diameter and each said first flexible line has a first flexible line diameter, and the upper cord diameter is greater than the first flexible line diameter.

6. The flexible net structure of claim 2, wherein the secondary net extends between the collapsible net upper lateral edge and the collapsible lower lateral edge.

7. The flexible net structure of claim 2, wherein the first flexible lines are uniformly configured between the collapsible net upper lateral edge and the collapsible net lower lateral edge.

8. The flexible net structure of claim 2, wherein the first flexible lines are non-uniformly configured between the collapsible net upper lateral edge and the collapsible net lower lateral edge.

9. The flexible net structure of claim 2, wherein the first flexible lines are orthogonally arranged with respect to each other within the collapsible net.

10. The flexible net structure of claim 2, wherein the first flexible lines are non-orthogonally arranged with respect to each other within the collapsible net.

11. The flexible net structure of claim 2, further comprising a mid-cord attached to the collapsible net and extending lengthwise between the first lengthwise end and the second lengthwise end;

wherein the wall portion extends widthwise between the upper lateral edge and the mid-cord, and the ground portion extends widthwise between the lower lateral edge and the mid-cord.

12. The flexible net structure of claim 11, wherein the secondary net extends between the upper lateral edge and the mid-cord.

13. The flexible net structure of claim 11, wherein the second length is less than the first length; and wherein the mid-cord extends a third length, and the first length is greater than the third length, and the third length is greater than the second length.

14. A flexible net structure, comprising:

a collapsible net formed from a plurality of spaced apart first flexible lines that define a plurality of openings within the net, the net having a width that extends between a collapsible net upper lateral edge and a collapsible net lower lateral edge, a first length that extends between a first lengthwise end and a second lengthwise end at the collapsible net upper lateral edge, and a second length that extends between the first lengthwise end and the second lengthwise end at the collapsible net lower lateral edge;

a flexible upper cord attached to the collapsible net at the collapsible net upper lateral edge extending the first length of the net, and the upper cord has an upper cord diameter and each said first flexible line has a first flexible line diameter, and the upper cord diameter is greater than the first flexible line diameter;

wherein the collapsible net is configurable in a closed configuration where the first lengthwise end and the second lengthwise end are disposed proximate each other, and the collapsible net lower lateral edge defines a trap opening; and a secondary net formed from a plurality of spaced apart second flexible lines that define a plurality of openings within the secondary net, wherein the secondary net is attached to the collapsible net and disposed as an interior layer of the flexible net structure contiguous with the collapsible net and extends between the collapsible net first lengthwise end and the collapsible net second lengthwise end;

wherein the first flexible lines consist of a first polymeric material and the upper cord consists of a second polymeric material, and wherein the first polymeric material and the second polymeric material consist of polypropylene, nylon, polyester, polyethylene, or aramid.

15. The flexible net structure of claim 14, wherein the first flexible lines have a diameter D1 and the second flexible lines have a diameter D2, and the diameter D2 is larger than the diameter D1.

16. The flexible net structure of claim 15, wherein the diameter D2 of the second flexible lines is in a range of about one and a half to two and a half times larger than the diameter D1 of the first flexible lines.

17. The flexible net structure of claim 16, wherein the secondary net extends between the collapsible net upper lateral edge and the collapsible net lower lateral edge.

18. The flexible net structure of claim 14, wherein the first flexible lines and the second flexible lines consist of the first polymeric material.

19. The flexible net structure of claim 14, wherein the first flexible lines have a first tensile strength and the second flexible lines have a second tensile strength, and the second tensile strength is greater than the first tensile strength.

20. The flexible net structure of claim 14, wherein the second length is less than the first length.

21. The flexible net structure of claim 14, wherein the first flexible lines are uniformly configured between the collapsible net upper lateral edge and the collapsible net lower lateral edge, and uniformly configured between the first lengthwise end and the second lengthwise end.

22. The flexible net structure of claim 14, wherein the secondary net is disposed on an interior side of the flexible net structure.

23. The flexible net structure of claim 14, wherein the second flexible lines have a greater cut resistance than the first flexible lines.

24. The flexible net structure of claim 14, wherein the first flexible lines have a first tensile strength and the flexible upper cord has a third tensile strength, and the third tensile strength is greater than the first tensile strength.

25. The flexible net structure of claim 14, wherein the first polymeric material is different than the second polymeric material.

26. The flexible net structure of claim 14, wherein the second flexible lines consist of a third polymeric material.

27. The flexible net structure of claim 14, wherein the first flexible lines are orthogonally arranged with respect to each other.

28. The flexible net structure of claim 14, wherein the first flexible lines are non-orthogonally arranged with respect to each other.

29. The flexible net structure of claim 14, wherein the collapsible net comprises a first net region and a second net region;

wherein the first net region extends widthwise between the upper lateral edge and the second net region, and the second net region extends widthwise between the lower lateral edge and the first net region.

30. The flexible net structure of claim 29, wherein the first net region has a first net configuration, and the second net region has a second net configuration, and the first net configuration is the same as the second net configuration.

31. The flexible net structure of claim 29, wherein the first net region has a first net configuration, and the second net region has a second net configuration, and the first net configuration is different than the second net configuration.

32. The flexible net structure of claim 29, further comprising a mid-cord attached to the collapsible net and extending lengthwise between the first lengthwise end and the second lengthwise end;

wherein the first net region extends widthwise between the upper lateral edge and the mid-cord, and the second net region extends widthwise between the lower lateral edge and the mid-cord.

33. The flexible net structure of claim 32, wherein the secondary net extends between the upper lateral edge and the mid-cord.

34. A trap for trapping animals, comprising:

a flexible net structure including:

a collapsible net formed from a plurality of spaced apart first flexible lines that define a plurality of openings within the net, the net having a width that extends between a collapsible net upper lateral edge and a collapsible net lower lateral edge, a first length that extends between a first lengthwise end and a second lengthwise end at the collapsible net upper lateral edge, and a second length that extends between the first lengthwise end and the second lengthwise end at the collapsible net lower lateral edge; and a flexible upper cord attached to the collapsible net at the collapsible net upper lateral edge extending the first length of the net;

a secondary net formed from a plurality of spaced apart second flexible lines that define a plurality of openings within the secondary net, the secondary net attached to the collapsible net, extending between the collapsible net first lengthwise end and the collapsible net second lengthwise end; and a plurality of posts configured to support the flexible net structure above a ground surface;

wherein the trap is disposable in a set configuration wherein the collapsible net is disposed in a closed circumferential structure that defines a trap interior region and a trap opening, and in the set configuration, a ground portion of the collapsible net, including the trap opening defined by the ground portion, is in contact with the ground surface and a wall portion of the collapsible net extends upwardly from the ground surface, and in the set configuration the upper cord is maintained in tension;

wherein the secondary net is disposed contiguous with the wall portion of the collapsible net.

35. The trap of claim 34, wherein the first flexible lines have a diameter D1 and the second flexible lines have a diameter D2, and the diameter D2 is larger than the diameter D1, and the first flexible lines and the second flexible lines comprise the same material.

36. The trap of claim 35, wherein the diameter D2 of the second flexible lines is in a range of about one and a half to two and a half times larger than the diameter D1 of the first flexible lines.

37. The trap of claim 34, wherein the secondary net extends between the collapsible net upper lateral edge and the collapsible net lower lateral edge.

38. The trap of claim 34, wherein in the set configuration the flexible net structure has a first circumference at the collapsible net upper lateral edge and a second circumference at the trap opening that is smaller than the first circumference at the collapsible net upper lateral edge.

39. The trap of claim 38, wherein the first flexible lines consist of a first polymeric material and the upper cord consists of a second polymeric material.

40. The trap of claim 14, wherein the second flexible lines consist of a third polymeric material.

41. The trap of claim 39, wherein the first polymeric material is the same as the second polymeric material.

42. The trap of claim 41, wherein the second flexible lines consist of a third polymeric material, and the first polymeric material, the second polymeric material, and the third polymeric material are the same polymeric material.

43. The trap of claim 34, wherein the upper cord has an upper cord diameter and each said first flexible line has a first flexible line diameter, and the upper cord diameter is greater than the first flexible line diameter.

44. The flexible net structure of claim 43, wherein the upper cord diameter is at least 150% of the first flexible line diameter.

45. The trap of claim 34, wherein in the set configuration the upper cord is attached to the plurality of posts and the wall portion of the collapsible net is attached to the plurality of posts at a position disposed vertically between the upper cord and the ground portion.

46. The trap of claim 34, further comprising a plurality of tensioning structures, and wherein in the set configuration the upper cord is attached to the plurality of posts and the plurality of tensioning structures are configured to maintain the upper cord in tension.

47. The trap of claim 34, wherein the first flexible lines are orthogonally arranged with respect to each other within the collapsible net.

48. The trap of claim 34, wherein the first flexible lines are non-orthogonally arranged with respect to each other within the collapsible net.

49. The trap of claim 34, wherein the wall portion has a first net configuration, and the ground portion has a second net configuration, and the first net configuration is the same as the second net configuration.

50. The trap of claim 34, wherein the wall portion has a first net configuration, and the ground portion has a second net configuration, and the first net configuration is different than the second net configuration.

51. The trap of claim 34, further comprising a mid-cord attached to the collapsible net and extending lengthwise between the first lengthwise end and the second lengthwise end;

wherein the wall portion extends widthwise between the upper lateral edge and the mid-cord, and the ground portion extends widthwise between the lower lateral edge and the mid-cord.

52. The trap of claim 34, wherein the secondary net extends widthwise from the upper lateral edge to the ground portion.

* * * * *